United States Patent
Hirni et al.

(10) Patent No.: US 6,731,609 B1
(45) Date of Patent: May 4, 2004

(54) TELEPHONY SYSTEM FOR CONDUCTING MULTIMEDIA TELEPHONIC CONFERENCES OVER A PACKET-BASED NETWORK

(75) Inventors: James Hirni, Hollis, NH (US); Michael Ely, Pelham, NH (US); Bruce Cottle, North Chelmsford, MA (US); Christopher Gindel, Winchester, MA (US); Robert D'Angelo, Windham, NH (US)

(73) Assignee: Aspect Communications Corp., San Jose, CA (US)

( * ) Notice: Subject to any disclaimer, the term of this patent is extended or adjusted under 35 U.S.C. 154(b) by 0 days.

(21) Appl. No.: 09/387,322

(22) Filed: Aug. 31, 1999

Related U.S. Application Data

(60) Provisional application No. 60/114,324, filed on Dec. 31, 1998.

(51) Int. Cl.[7] .............................................. H04L 12/18
(52) U.S. Cl. ..................................................... 370/260
(58) Field of Search ................................ 370/260, 261, 370/262, 263, 266; 379/158, 202, 205

(56) References Cited

U.S. PATENT DOCUMENTS

| | | | | |
|---|---|---|---|---|
| 5,452,348 A | * | 9/1995 | Adams et al. ............... | 379/202 |
| 5,568,544 A | * | 10/1996 | Keeler et al. ................ | 379/273 |
| 5,673,080 A | * | 9/1997 | Biggs et al. .................... | 348/15 |
| 5,689,553 A | * | 11/1997 | Ahuja et al. ................. | 379/202 |
| 5,737,321 A | * | 4/1998 | Takahashi .................... | 370/263 |
| 5,963,547 A | * | 10/1999 | O'Neil et al. ................ | 370/260 |
| 5,991,276 A | * | 11/1999 | Yamamoto ................... | 370/260 |
| 6,038,302 A | * | 3/2000 | Burok et al. ................. | 379/201 |
| 6,046,762 A | * | 4/2000 | Sonesh et al. ................. | 348/16 |
| 6,081,513 A | * | 6/2000 | Roy ............................. | 370/260 |
| 6,122,364 A | * | 9/2000 | Petrunka et al. ............. | 379/265 |
| 6,173,053 B1 | * | 1/2001 | Bogart et al. ................ | 379/266 |
| 6,366,658 B1 | * | 4/2002 | Bjornberg et al. ........... | 379/207 |
| 6,424,709 B1 | * | 7/2002 | Doyle et al. ................. | 379/265 |
| 6,526,041 B1 | * | 2/2003 | Shaffer et al. ............... | 370/352 |

FOREIGN PATENT DOCUMENTS

| | | |
|---|---|---|
| EP | 0 817 451 A2 | 1/1998 |
| WO | WO 97/42728 | 11/1997 |
| WO | WO 98/13974 | 4/1998 |
| WO | WO 98/17048 | 4/1998 |
| WO | WO 98/136995 | 4/1998 |

OTHER PUBLICATIONS

A DataBeam Corporation White Paper, H.323 Version 2.0, A Primer On The H.323 Standard, pp. 1–16.

(List continued on next page.)

*Primary Examiner*—Kenneth Vanderpuye
(74) *Attorney, Agent, or Firm*—IP Creators; Charles C. Cary

(57) ABSTRACT

A telephony system for conducting multimedia telephonic communications across a packet-based network is described between a caller system and an agent system through a software switch. The software switch receives from the caller system a packet representing a request to conduct a multimedia telephonic conference with an agent system. The switch exchanges packets with the caller system to establish a call with the caller system. The switch provides an application program interface to a telephony application program through which the telephony application program can control multimedia telephonic conferences between the caller and agent systems. The switch then processes the call according to the commands received through the application program interface from the telephony application program. In one embodiment, the application is an Automatic Call Distributor (ACD), which routes calls through the software switch. In another embodiment, a CTI subsystem provides an interface to a CTI server so that the ACD can work together with standard PSTN call centers.

9 Claims, 16 Drawing Sheets

OTHER PUBLICATIONS

A DataBeam Corporation White Paper, t.120, A Primer on the T.120 Series Standard, pp. 1–16.

Lucent Technologies, Inc., IP Exchange Systems, Bringing Together All Your Communication on a single Network, Oct. 1998.

XP–000777437 Fernand Hollevoet, "The Any–Media Call Centre," Brussels, Belgium.

XP–000784128 Norbert Hahn, "Dialog via Internet Call Center," Berlin (German language).

* cited by examiner

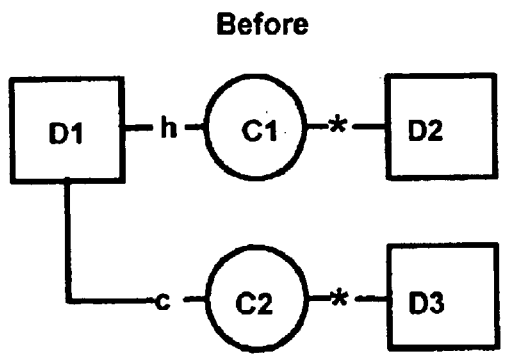
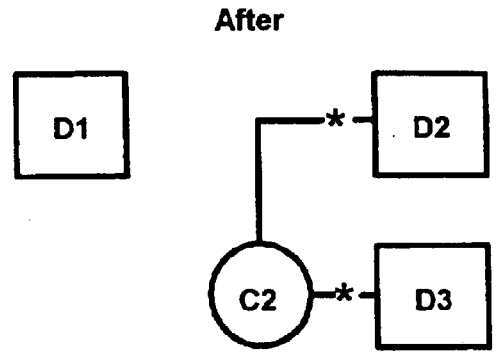
FIG. 6A
FIG. 6B
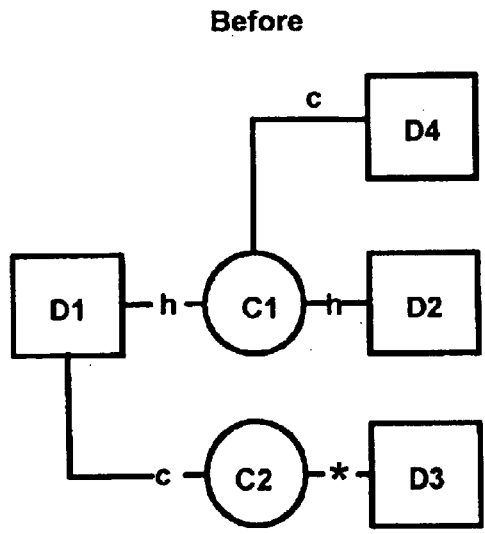
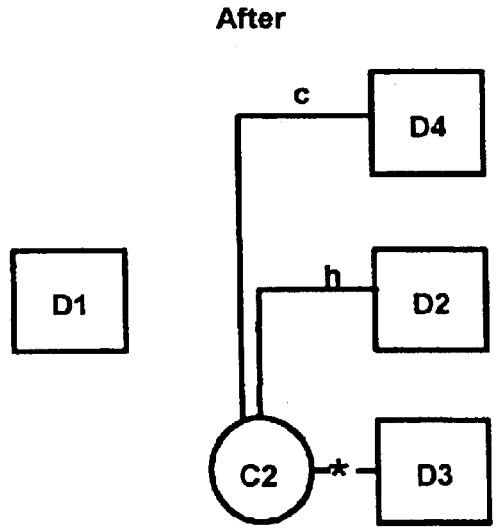
FIG. 6C
FIG. 6D

TELEPHONY SYSTEM FOR CONDUCTING MULTIMEDIA TELEPHONIC CONFERENCES OVER A PACKET-BASED NETWORK

RELATED APPLICATION

This application claims the benefit of U.S. Provisional Application, Serial No. 60/114,324, filed Dec. 31, 1998 and incorporated by reference herein.

FIELD OF THE INVENTION

The invention relates generally to telecommunication systems. More specifically, the invention relates to a system and method for providing telecommunications over a packet-based network.

BACKGROUND OF THE INVENTION

Since the advent of the telephone, telecommunications companies have used circuit switching technology to route voice communications over a communication path between a caller and a receiver (i.e., endpoints) using a fixed, dedicated bandwidth. In general, circuit switching technology is the equipment that provides the communication path between the endpoints. Advances in circuit switching technology have enabled various call control features, such as, call hold, and three-way calling. Circuit-switching technology has further improved through the introduction of cord board switching, analog switches, and digital switches.

In parallel with the technological developments of circuit switching, the field of data communications has experienced dramatic progress with the rise of the Internet and the World Wide Web. Data transmission across the Internet is based on Internet Protocol (IP), which transmits information in packets. Packets follow various routes through the Internet to reach their destinations. Packet switches or routers determine the path taken by each packet.

Because of the cost advantage of packet communications, an industry has arisen to devise gateway technology for translating circuit-based voice data into packet-based voice data so that voice data can travel over a packet-based network. The packet-based voice data is converted back into circuit-based voice data and routed to a circuit switch.

However, converting voice data between the circuit domain and packet domain using gateways has various drawbacks. For example, the conversion of information between the circuit and packet domains reduces transmitted information to the lowest common denominator because of restrictions characteristic of the circuit domain. In particular, using packet technology, information can be transmitted for audio communications, data communications, and video communications. Packet audio can be stereo, high fidelity, low bit-rate, or other options. In the circuit domain, voice is restricted to the 300 Hz to 3,000 Hz frequency range. Data and video can be transmitted using Nx64 circuits. However, specialized, expensive hardware is required to switch and provide features. A second drawback is that a delay occurs when compressing circuit voice data into packet voice data. Another drawback is the cost of a gateway to perform conversions.

There remains, therefore, a need for the ability to conduct telecommunications exclusively in the packet domain to avoid the drawbacks of converting between the circuit and packet domains, without losing the call processing functions presently available in the circuit switching technology.

SUMMARY OF THE INVENTION

The invention features a method for conducting multimedia telephonic conferences over a packet-based network. A packet representing a request from a caller system to conduct a multimedia telephonic conference with an agent system is received over the packet-based network. Packets are exchanged with the caller system to establish a call with the caller system. An application program interface is provided to a telephony application program through which the telephony application program can control multimedia telephonic conferences between the caller and agent systems. A command is received from the telephony application program through the application program interface to process the call according to the command.

In one embodiment, packets are exchanged with the agent system to establish a second call with the agent system. The call established with the caller system is linked to the call established with the agent system to establish a multimedia telephonic conference between the caller and the agent systems. Various operations can be performed on this multimedia conference. Such operations include placing the caller system on-hold, retrieving the caller system from hold, transferring the conference to another agent system, adding another agent system to the conference, silently monitoring the conference, and barging in on the conference.

In another aspect, the invention features a multimedia telephonic communication system in a packet-based network having a caller system transmitting a request to conduct a multimedia telephonic conference with an agent system. The multimedia telephonic communication system includes a server system in communication with the caller system over the packet-based network for receiving the request. The server system has software installed thereon and a processor executing the software. The software includes an application program interface, through which a telephony application program can control multimedia telephonic conferences, and a switch that receives a command from the telephony application program through the application program interface to control a multimedia telephonic conference between the caller and agent systems according to the command.

In one embodiment, the software includes the telephony application program and that telephony application is an automatic call distributor (ACD), which routes calls received by the switch from the caller system to an available agent system. In another embodiment, the software includes a computer technology integration (CTI) subsystem which communicates with a CTI server.

In another aspect, the invention features a call center for handling multimedia telephonic calls from callers over a packet-based network. The call center includes an agent system and a server system in communication with a caller system to receive a request over the packet-based network to conduct a telephonic conference with the agent system. The server system has software installed thereon and a processor executing the software. The software includes a telephony application program, a switch, and an application program interface through which the telephony application program communicates with the switch to establish a telephonic conference between the caller and the agent systems in response to the request.

BRIEF DESCRIPTION OF THE DRAWINGS

The invention is pointed out with particularity in the appended claims. The above and further advantages of the invention may be better understood by referring to the following description in conjunction with the accompanying drawings, in which:

FIGS. 6A–6D are block diagrams illustrating the operation of the Transfer Call request;

DETAILED DESCRIPTION

Figure 1:
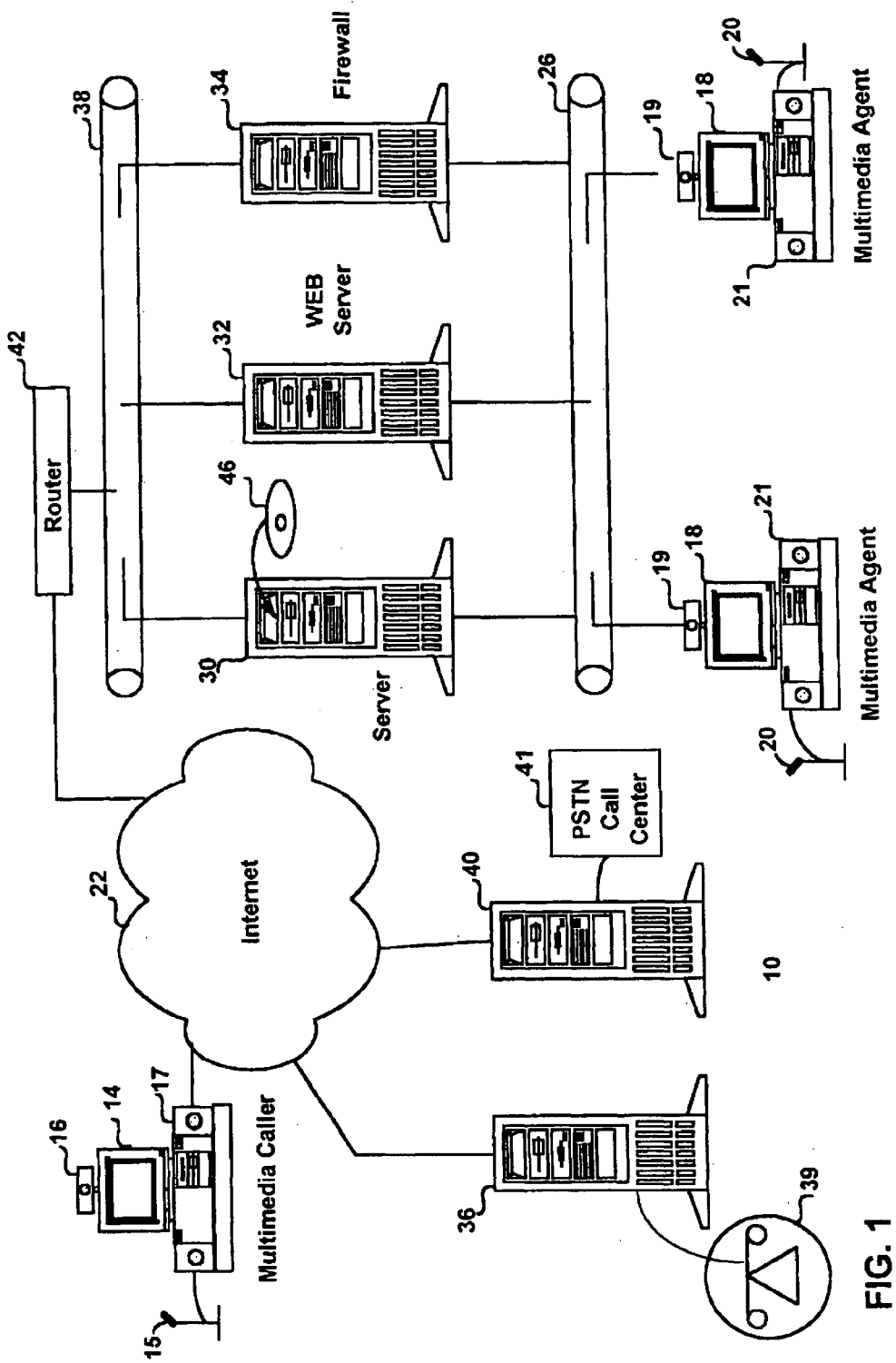
FIG. 1 is a diagram of an embodiment of a telephony system for conducting multimedia telephonic communication among callers and agents through a server system over a packet-based network.

FIG. 1 shows an exemplary embodiment of a telephony system 10 that conducts multimedia (i.e., any combination of audio, video, and data) telephonic communication between a caller system 14 and agent systems 18 over a packet-based network 22 (e.g., the Internet, World Wide Web, WAN, LAN). The agent systems 18 are connected to a local area network (LAN) 26 (e.g., Ethernet). A server 30, web server 32, and a firewall 34 connect the LAN 26 to a second network 38. A router 42 connects the network 22 to the second network 38 for forwarding packets addressed to the server 30. A standard telephone 39 connected to the PSTN (Public Switched Telephone Network) is connected to the network 22 through a gateway 36, which is a server that connects the PSTN to networked computers. A CTI (Computer Telephony Integration) server 40 connects a PSTN call center 41 to the network 22.

The agent systems 18 together can provide a multimedia call center for handling multimedia telephone calls from multimedia-capable caller systems 14 (e.g., a kiosk). The call center can service callers (i.e., users of the caller systems 14) who are seeking data collaboration or technical support. An agent group is a set of agent systems 18 responsible for handling associated telephone calls. A supervisor agent can manage an agent group.

In one embodiment, the caller system 14 is a processor-based multimedia personal computer (e.g., Pentium class) having a connection to the network 22 or to an intranet in communication with the network 22. The personal computer includes a sound card, microphone 15 or telephone headset, speakers 17, and optionally a video capture card and video camera 16.

In one embodiment, software installed on the caller system 14 enables the caller system 14 to operate as an "Internet telephone" that places H.323 compliant telephone calls. The software includes an application program capable of placing audio calls using the H.323 standard and engaging data conferencing using the T.120 standard. In conjunction with the video camera 16, the application program can also provide face-to-face visual communication over the network 22. Examples of commercially available application programs that provide such functionality include NetMeeting™ 2.1 manufactured by Microsoft Corporation of Redmond, Wash., and IBVC (Intel Business Video Conferencing), version 4.0, manufactured by Intel Corporation of Santa Clara, Calif. While one embodiment of the invention uses the standard H.323 to conduct Internet telephone calls, it is to be understood that the telephony system 10 of the invention can be based on other multimedia protocols.

Components of the software produce a graphical user interface (GUI) through which a caller (i.e., a user of the caller system 14) can initiate multimedia telephone calls. Described in more detail below in connection with FIG. 15, other components of the software communicate with software on the server system 30 to achieve multimedia telephonic communication.

The caller system 14 also includes a browser application program for viewing information downloaded from web servers over the network 22. The browser provides a graphical user interface for navigating the network 22 and accessing information therefrom by downloading HTML Web pages. The browser application program can be Internet Explorer™ version 3.02 or greater manufactured by Microsoft Corp. or Netscape Navigator™ manufactured by Netscape Communications Corporation of Mountain View, Calif.

Each agent system 18 is a processor-based multimedia personal computer (e.g., Pentium class with MMX) or NT workstation. The agent system 18 includes memory, microphone 20 or telephone headset, a full duplex sound blaster compatible sound I/O interface, speakers 21, an interface to the LAN 26 (e.g., 10 or 10/100M bps Ethernet), and an optional video capture card and video camera 19.

The agent system 18 includes installed software that runs on a Windows/95, Windows/98, or NT workstation platform. The agent software can place audio calls and engage in data conferencing and face-to-face visual communication with the caller system 14 using the H.323 and T.120 standards. Like the software installed on the caller system 14, the multimedia telephonic functionality of the agent software can be implemented using Microsoft Corporation's NetMeeting™ or Intel Corporation's IBVC.

The installed agent software also includes an agent application program, which produces a graphical user interface (GUI). The GUI has graphical buttons for manipulating calls, such as placing a call on hold, retrieving a call on hold, initiating a new call, toggling between an active call and a call on hold, initiating a transfer to another agent, muting a call, and conferencing-in a third party. Agents (i.e., users of the agent systems 18) communicate with the server system 30 through the GUI to receive call-related information and issue commands to manipulate calls.

In one embodiment, communication among the caller system 14, agent systems 18, and server 30 over the network 22 use the TCP/IP protocol. Accordingly, each caller 14, agent 18, and server 30 system is configured with an IP address.

The server system 30 is any NT server compliant computer system. In one embodiment, the server system 30 includes a processor (e.g., Pentium II), memory, disk drive, CDROM, and an interface to the LAN 26 (e.g., 10 or 10/100M bps Ethernet). A modem can provide remote access to the server 30. The server system 30 also includes software that runs on an NT server platform. A networking component of the server 30 supports TCP/IP communication.

According to the principles of the invention, software 46 installed on the server system 30 performs telephony functions that enable multimedia communication between callers (e.g., users of the caller system 14, the standard telephone 39, and the PSTN call center 41) and agent systems 18. As described further below, such telephony functions include automatic call distribution and call control operations.

In one embodiment, the software 46 is developed using an object-oriented language (e.g., C++). Objects created and used during execution of the software 46 include devices, connections, and calls. Calls are objects that provide connectivity between endpoints. Each call has a unique call identifier that is used by the software 46 to reference that call.

Each call also has a call context, which is information that the server system 30 uses to manipulate (e.g., route) that call. For example, the call context can include the IP address of the caller system 14 and a destination call type. For example, call types can be multimedia telephony, VoIP, PSTN, Chat, or Email. In one embodiment, the call context includes other types of information represented by a <TAG><VALUE> format. The TAG indicates the type of information contained in the call context and the VALUE represents that information. Such tagged values can be created by a Web administrator and placed into Web Pages and into ACD Routing Tables described in connection with FIG. 15. The tagged values can include user information supplied through a Web page (e.g., a PIN) and information coded into a Web page by the Web administrator.

Connections represent the relationship between calls and devices. Each connection has a unique connection identifier that includes the call identifier and a device identifier of the device associated with that connection.

A connection can be in one of many states, including active, alerting, connecting, held, initiated, queued, and silent. An active connection to a device indicates that the device is actively exchanging protocol and data packets with the server system 30. The connection can also be logical, that is, the connection is active although the device and server 30 are currently not exchanging protocol and data packets.

In the alerting state, a connection is trying to contact a device. The connection is in the connecting state when the associated device is an active call participant (i.e., transmitting multimedia protocol and data packets). In the held state, the device is connected to the server 30 but not active. A connection that is trying to contact the caller is in the initiated state. In the queued state, the connection is queued awaiting service. In the silent state, the connection is monitoring a call but not actively participating.

Devices are objects that can establish a connection to the call 44. Each device has a unique device identifier. For example, a device identifier can be assigned when agent and agent groups are configured. Such devices are within the switching domain. The device identifier also can be an IP address of a device not in the switching domain, an alias name such as an e-mail address, or an E.164 address, which is a telephone number of a device behind the gateway 36.

Figure 2A:
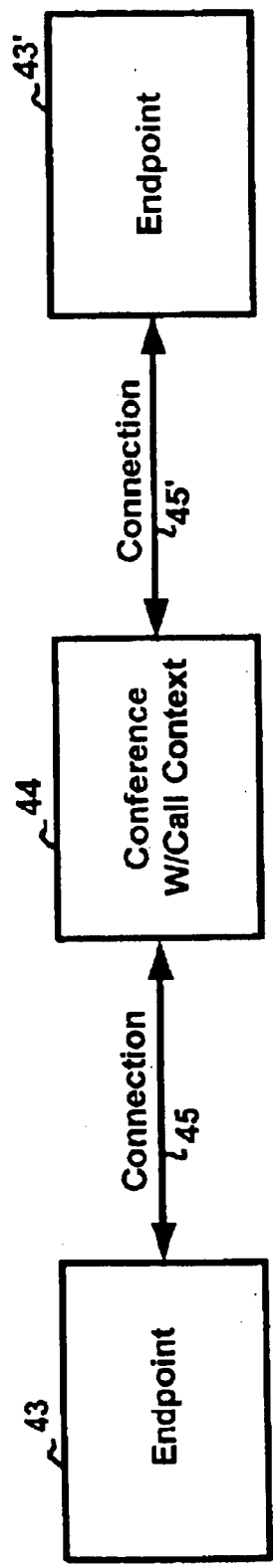
FIG. 2A and 2B are block diagrams of software objects produced and used by the telephony system to establish multimedia telephone calls over the network.

FIG. 2A shows a block diagram of a two-party conference 44 between endpoints 43 and 43'. As used hereafter, an endpoint is a party to a call, a call is an endpoint-to-server system 30 connection, and a conference is an endpoint-to-endpoint connection through the server system 30. Each endpoint 43, 43' has a connection 45, 45', respectively, in a two-party conference 44.

Figure 2B:
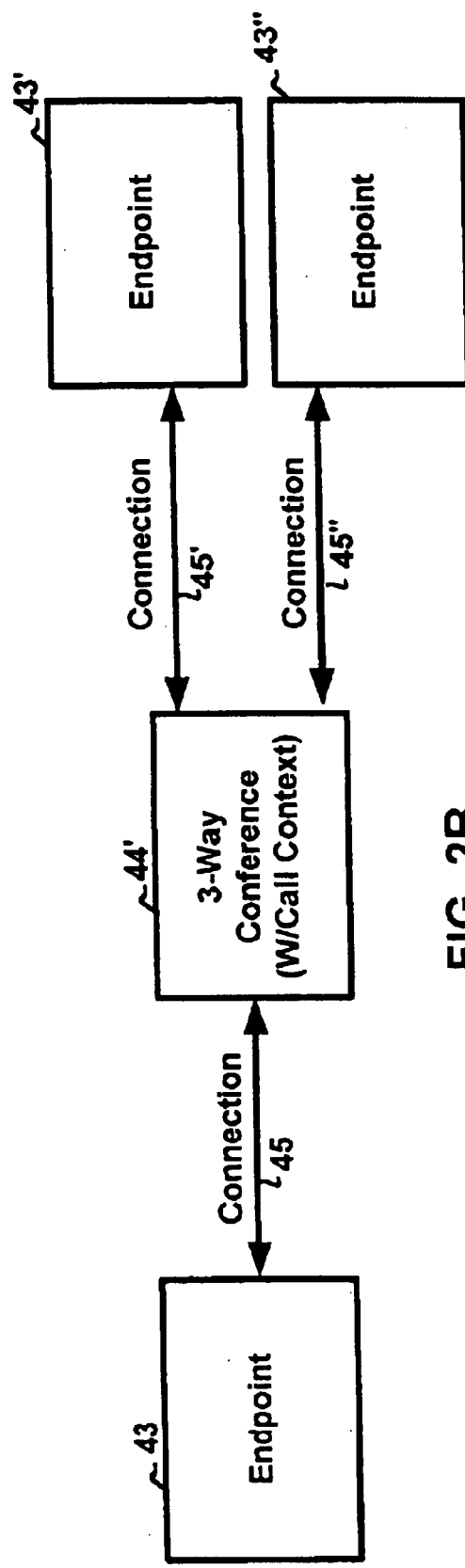

FIG. 2B shows a block diagram of a three-way conference 44' in which endpoint 43, 43', 43" participating in the conference call 44' has a connection 45, 45', and 45", respectively, in the conference 44'.

The firewall system 34 can be any computing device that controls access to other portions of the network (e.g., server 30). The firewall 34 can support a variety of operating system platforms, such as, for example, WINDOWS 95, WINDOWS 98, WINDOWS NT 3.51, and WINDOWS NT 4.0, Java, and Unix. The server 30 provides a firewall function for multimedia telephony by allowing only H.323 and T.120 calls to pass to the agent system 18, the firewall 34 provides for other protocol security. Security is furthered by the server 30 concealing the IP address of the agent system 18 from the network 22 as described below.

During operation, one embodiment of the telephony system 10 operates according to a half-call model, that is, a call is established between each party and the server system 30, and then the server system 30 links the calls to produce a multimedia telephonic conference between the parties.

The caller can initiate the multimedia conference through the Internet telephone or through the PSTN telephone 39 connected to the gateway 36. The caller can invoke the Internet telephone application directly or from the web browser. The web browser causes a CGI script to start the process of initiating a telephone call from the caller system 14 to the server system 30.

To establish the connection, the caller system 14 (or gateway 36) exchanges protocol packets with the server system 30. The firewall 34 can filter out packets that do not use the appropriate protocols. From packets that pass through the firewall 34, the server system 30 detects the call and stores the call for subsequent routing.

Incoming calls are routed to the first available agent within an agent group based upon call context information associated with the call. If there is no call context in the call, the call is sent to a default agent group. An incoming call is connected to an agent who has been available the longest. If no agent is available, the incoming call can wait in a queue to be routed to the first agent that becomes free. If more than one call is in the queue waiting to be routed, the call that has waited the longest is routed first. In one embodiment, the server system 30 plays media to the caller system 14 while the caller awaits a connection to an available agent.

Through the graphical user interface, an agent can notify the server system 30 that the agent is available to receive a call. In reply, the server system 30 places a call out to the agent system that is available to service the call and then places that agent system in conference with the caller.

The server system 30 then routes the packets pertaining to the call to the agent system 18 where the packets are converted to data, audio, or video output according to the type of packets. Thus, in the course of a single telephonic connection, data, video, and audio communications are exchanged between the caller system 14 and the agent system 18 over the packet-based network 22. When connected, the caller sees the agent, the name of the server system 30, the agent group to which the caller is connected, and any call context data supplied in the call.

In addition to establishing a connection with the caller system 14, the agent system 18 through the agent GUI can instruct the server system 30 to perform other operations with the call. Such operations include:

(1) placing the caller on hold;
(2) retrieving the caller from hold;
(3) transferring the caller from one agent to another;
(4) establishing a conference between the caller and two or more agents;
(5) muting one of the parties in a conference;
(6) silently monitoring the conference; and
(7) barging in on the conference.

On Hold
    An agent in conference with a caller can place the caller on hold, make a second call to another agent within the call center. A hold button on the agent GUI is provided for instructing the server system 30 to remove the agent from the conference with the caller. This disconnects the connection between the agent system 18 and the server system 30, but the caller remains connected to the server system 30. In one embodiment, the caller may be sent audio and video media while on hold. In another embodiment, the video and the audio are frozen for the caller. The server system 30 continues to associate the caller with the agent so that the agent can retrieve the caller later. The agent can toggle between an active call and a call on hold.

Retrieve
    The agent can retrieve a call that is on-hold by highlighting the call on-hold and pressing the Retrieve button on the agent GUI. This converts the connection to the caller that is on-hold into an active connection.

Transfer
    The agent can transfer the caller to another agent within the call center. The agent GUI has a button for transferring the call. The connection of the caller can be active or on hold when the server system 30 transfers the call to the second agent. A transfer causes the server system 30 to disconnect the connection of the agent, place a new call to the second agent, and then link the new call into a conference with the caller who remained connected to the server system 30.

Three-way Conferencing
    A first agent engaged in a call with the caller can add a second agent to the call. The first agent places the caller on hold, calls the second agent, and presses a Conference button on the agent GUI. This causes the server system 30 to disconnect both agent calls and then reconnect the agents into the same conference with the caller on hold.

The first agent can select the second agent from a list of available agents, using a mouse or other input device to highlight and launch the desired connection. The server system 30 receives the selection indicated by the first agent and performs the operations needed to accomplish the request.

Muting
    During a three-party conference between the caller and two agents, one agent system can block audio transmissions to the caller system 14 by pressing the mute button on the agent GUI. Consequently, the agent systems can confer without their audio transmissions passing to the caller.

Silent Monitoring
    An agent system 18 can listen to an existing two-party conference between a first agent system and the caller system 14 without any media transmissions from the agent system 18 passing to the first agent system or caller system 14.

Barging In
    An agent system that is silently monitoring a two-party conference can join the conference by pressing the barge-in button on the agent GUI.

Server System Software (46)

Figure 3:
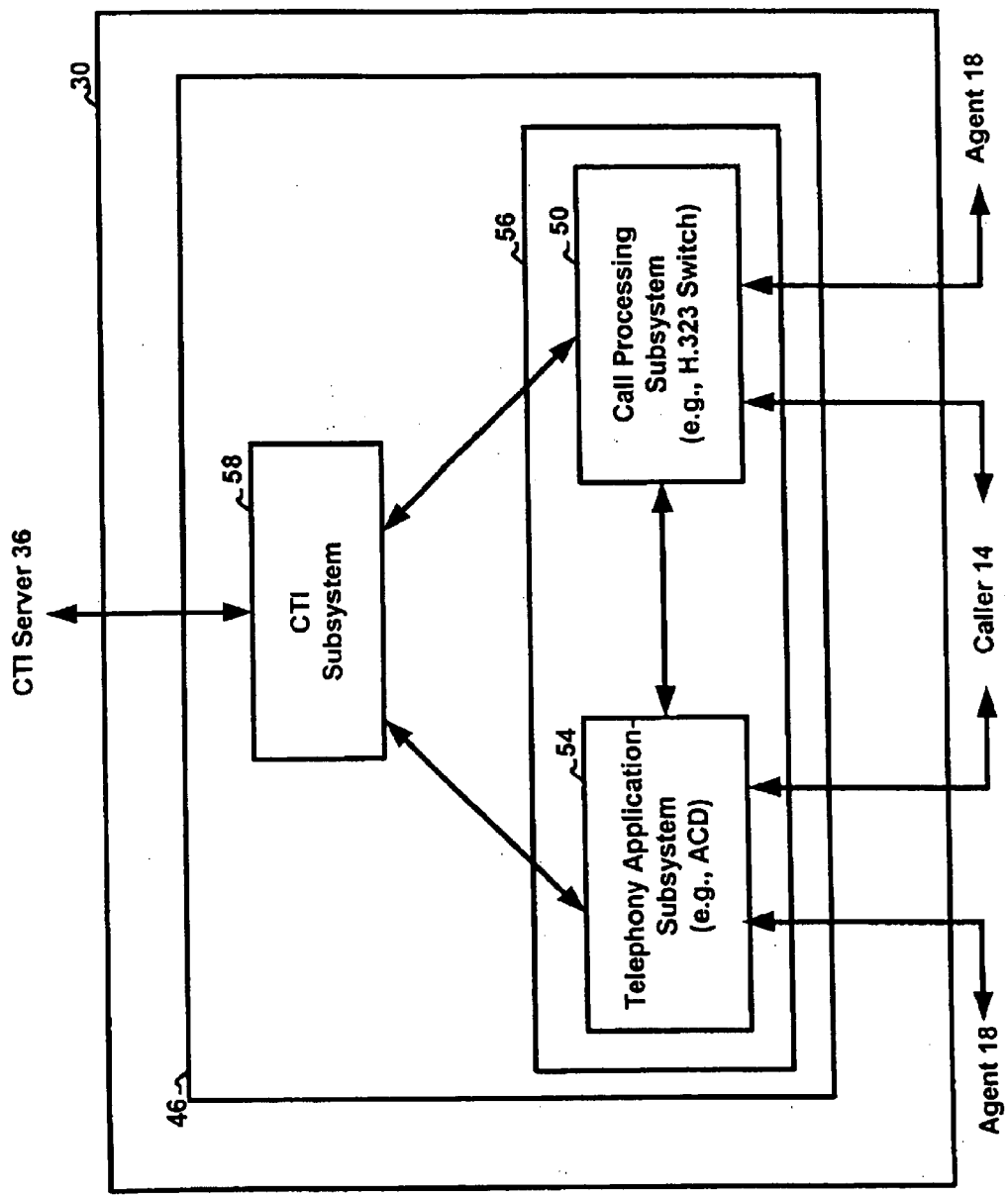
FIG. 3 is a block diagram of software components installed on the server system, including call processing, telephony application, and CTI subsystems, to implement telephony functionality of the telephony system.

FIG. 3 shows components of the software 46 installed on the server system 30 according to the principles of the invention. The components of software 46 include a call processing (CP) subsystem 50, a telephony application subsystem 54, and a CTI subsystem 58. The CP subsystem 50 is in communication with the caller 14 and agent 18 systems through the standard Internet protocols (e.g., H.323, T.120). The CP subsystem 50 enforces predetermined telephony rules to provide connectivity between caller systems 14 and agent systems 18 and to control telephone conferences conducted through the server system 30.

The telephony application subsystem 54 is in communication with the CP and CTI subsystems 50, 58 and with the users of the caller and agent systems 18. Although shown to reside on the server system 30, some of the software components of the telephony application subsystem 54 can reside on the caller and agent systems 14, 18 (see FIG. 15).

The application subsystem 54 controls the operation of the CP subsystem 50 to implement one of a variety of telephony applications 56. Examples of telephony applications include an ACD (Automatic Call Distributor), an IVR (Interactive Voice Response), a PBX (Private Branch Exchange), a CO (Central Office), and an ESP (Enhanced Service Platform).

The CTI subsystem 58 is in communication with the CTI server 40. Through the CTI subsystem 58, the CTI server 40 can monitor and control the functionality of the telephony application subsystem 54. As described in more detail in connection with FIG. 16, the CTI subsystem 58 can provide connectivity to various CTI server implementations.

In general, the telephony application subsystem 54 operates together with the CP subsystem 50 to provide a telephony application 56. In one embodiment, the telephony application 56 is an Automatic Call Distributor 56, and the telephony application subsystem is referred to as an ACD subsystem 54. The ACD subsystem 54 controls the CP subsystem 50 to produce automatic call distribution functionality. The CP subsystem 50 detects an incoming telephone call, establishes a connection with the caller system 14, and reports the call to the ACD subsystem 54. The ACD subsystem 54 directs the CP subsystem 50 to route incoming and outgoing multimedia calls between agent systems 18 and caller systems 14.

To perform the routing, the ACD subsystem 54 references routing tables to map connections between agent and caller systems. The routing determination can be made with assistance from the CTI server 40 through a route request through the CTI subsystem 58. The ACD subsystem 54 then issues a request to the CP subsystem 50 to establish a connection with the available agent system 18.

Events generated while establishing the connection can be transmitted to the CTI server 40 through the CTI subsystem 58. Once connected, the available agent system 18 can perform call control to manipulate the established connection through the ACD subsystem 54. In response to commands provided by the agent system 18, the ACD subsystem 54 directs the CP subsystem 50 to implement the specified connection manipulation. The CP subsystem 50 generates events to notify the ACD 54 and CTI 58 subsystems of the results. When the caller or agent ends the telephone call by hanging up, the CP subsystem 50 produces a series of events that signals the ACD 54 and CTI 58 subsystems to terminate the call. The CP subsystem 50 tracks the state of each connection and cleans up connections when disconnected.

Call Processing Subsystems (50)

Figure 4:
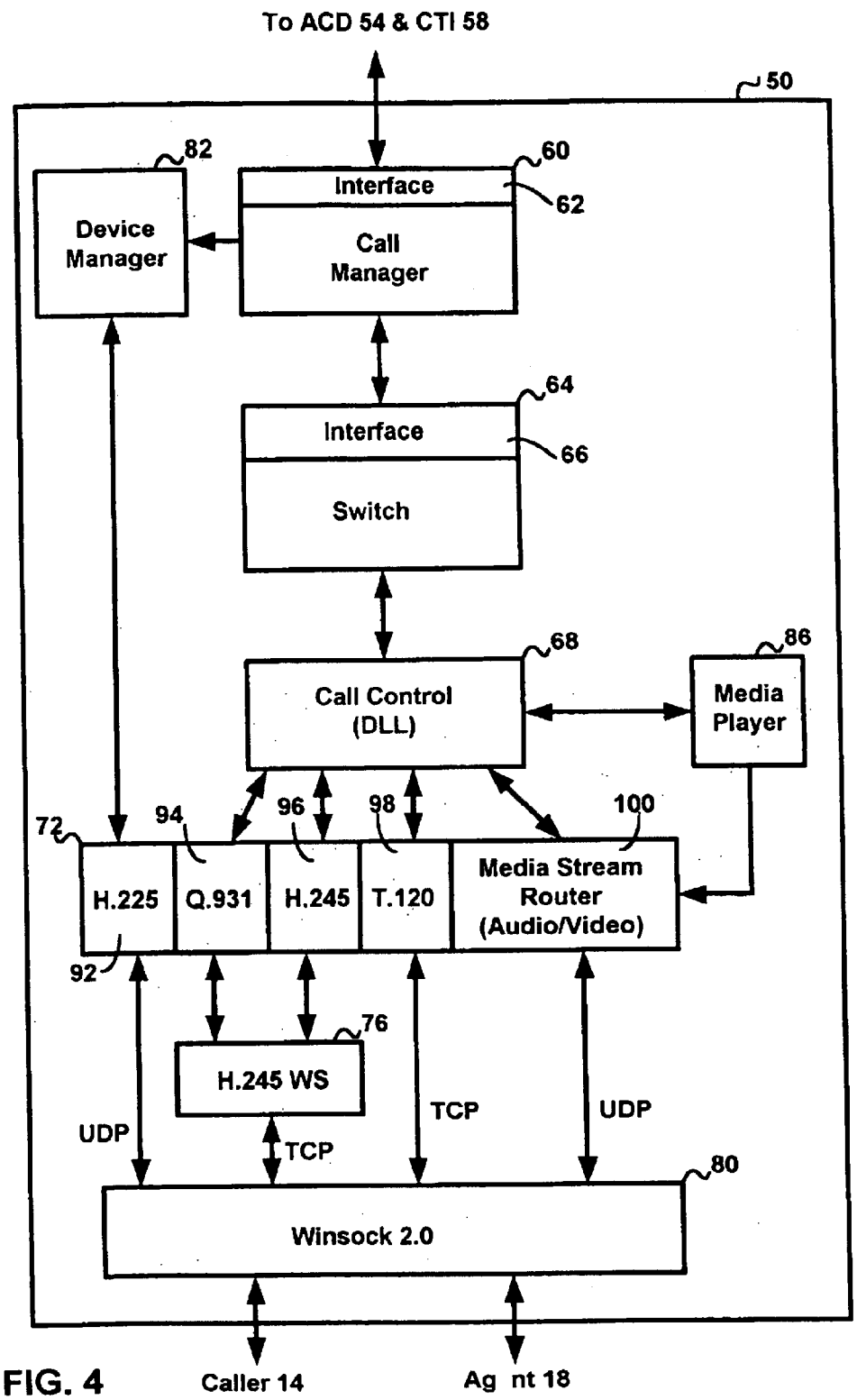
FIG. 4 is a block diagram of the software components for the call processing subsystem component of the software installed on the server system.

FIG. 4 shows software components of an exemplary embodiment of the CP subsystem 50, also referred to as the H.323 switch 50, including a Call Manager 60, a switching component 64, a Call Control 68, a protocol stack 72, a H.245WS component 76, a Winsock 80, a Device Manager 82, and a media player 86.

The Call Manager 60 is in communication with the ACD 54 and CTI 58 subsystems to provide an application interface 62 that implements the ACD functionality. The Call Manager 60 is also in communication with the switching component 64, translating requests received from the ACD and CTI subsystems 54 and 58 through the application interface 62 into requests to the switching component 64. Examples of requests provided by the Call Manager application interface 62 for use by the ACD and CTI subsystems 54 and 58 are as follows.

Figure 5A:
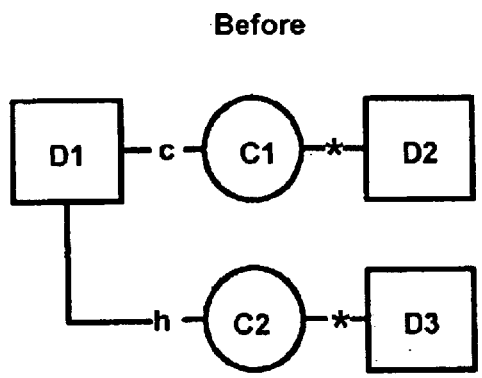
FIGS. 5A and 5B are block diagrams illustrating the operation of the Alternate Call request.
Figure 5B:
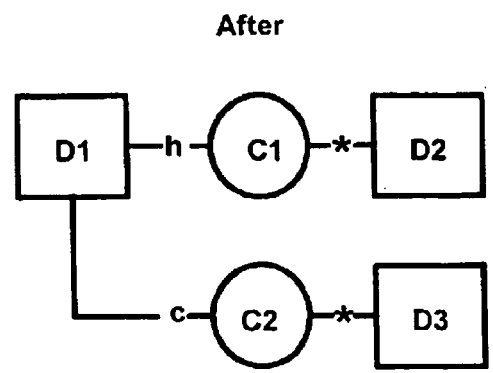

An "Alternate Call" request toggles an endpoint between two conferences logically connected to that endpoint. FIGS. 5A and 5B illustrate the "Alternate Call" process. Initially, the endpoint D1 has an active connection to the switch 50 in a first conference C1 with another endpoint D2. The endpoint D1 also has inactive (i.e., on-hold) logical connection to the H.323 switch 50 in a second conference C2 with another endpoint D3. The Alternate Call request disconnects the endpoint D2 from the H.323 switch 50, placing the connection between the endpoint D1 and the H.323 switch 50 in the first conference C1 on hold. This request also connects the endpoint D3 to the H.323 switch 50 to render active the connection between the endpoint D1 and the H.323 switch 50 in the first conference C2 so that multimedia communication can flow between endpoints D1 and D3.

A "Silent Monitor" request allows an endpoint to listen an existing two-party call. The monitoring endpoint receives the audio and specified video data. In one embodiment, at least one and no more than two connections must exist in the call. Upon executing a successful Silent Monitor request, the endpoint has an active connection in the call, but any media transmitted by the monitoring endpoint does not pass to the other connections.

A "Barge in" request enables an endpoint that is silently monitoring a conference to become an active participant of the conference. Initially, the connection between the monitoring endpoint and the H.323 switch 50 is in a Silent Monitor state. Upon successful barge in, the connection is in the connected state.

A "Clear Connection" request disconnects a connection between the H.323 switch 50 and an endpoint. The disconnected endpoint can be engaged in a conference with one or more other endpoints. This request can implicitly terminate a call when there remains only one other connected endpoint after the disconnection.

A "Conference Call" request adds a connection to an existing conference between two or more endpoints.

A "Deliver" request informs the Call Manager 60 that a logical connection is established between a call ad an agent or agent group. For agent groups, the Call Manager 60 creates a new connection in the alerting state. For agents, the Call Manager 60 attempts to establish a connection with an agent endpoint.

A "Divert Call" request connects a device to a call, aborting the queued connection for the call and establishing a new connection. This can occur upon finding an available agent for a queued connection or upon requiring a new group.

A "Hold Call" request disconnects an agent system 18 in conference with the caller system 14 from the H.323 switch 50 but maintains a logical connection to the call of the caller 14. The connection between the caller 14 and the H.323 switch 50 enters a hold state. This enables the agent to use the agent system 18 without disconnecting the caller.

A "Retrieve Call" request converts a connection to an endpoint that is on-hold to an active connection to reestablish a conference with that endpoint.

A "Make Predictive Call" request creates a new call between two endpoints. The endpoints can be local, remote, or through the gateway 36.

A "Set Hold Media" request specifies media files to be played to an endpoint over a connection that is in the hold state. The request can support attributes that indicate how the media should be played.

A "Connect Media" request plays a media stream to an endpoint awaiting an active connection to another endpoint (i.e., the waiting endpoint is on hold or queued). Specified parameters can determine how to transmit the media stream.

A "Queue" request updates the connection status to an agent group. Generally, the Queue request follows a Delivered request.

A "Start" request permits the processing of incoming calls. Incoming calls are not processed until the telephony application (e.g., ACD) indicates a readiness to receive incoming call control events. Upon receipt of the start request, the Call Manager 60 registers with the switching component 64 to start receiving events.

A "Transfer Call" request moves a call from one endpoint to another endpoint. FIG. 6A illustrates the Transfer Call with an endpoint D1 initially having connections to two different calls C1, C2 in conference with endpoints D2, D3, respectively. FIG. 6B shows the result of the Transfer Call request, which places endpoints D2 and D3 in conference by connecting endpoint D2 to the call C2. FIG. 6C shows that the Transfer Call request can also connect a new endpoint into an existing conference. In this case, an endpoint D1 initially has two connections to two different calls C1, C2. Here, call C1 is a three-party conference. One of the calls C1 is merged into the other call C2. The endpoint D1 is not connected to either call.

A "Transfer to Device" request transfers a call from one endpoint to another device. The device can be an agent group or another endpoint.

A "Mute Conference" request enables blocking of audio transmissions to one endpoint connected to a three-party (or more) conference so that the other endpoints engaged in the conference can confer without that one endpoint hearing the conversation.

A "Select Video" request specifies the source of video to be received. Use of this request is appropriate where the specifying endpoint is in a conference with two or more other endpoints and can therefore choose which video to view from among these other endpoints.

The Call Manager application interface 62 also provides functions for use by the Call Manager 60 to send events to the ACD and CTI subsystems 54, 58. Some of these events are responses to certain requests received from the ACD or CTI subsystems 54, 58. For example, the Call Manager 60 issues a "Hold init" event to respond to a corresponding "Hold Call" request from the ACD subsystem 54 to indicate that the request is valid and being processed.

Other events issued by the Call Manager 60 serve to notify the ACD and CTI subsystems 54, 58 that processing of a particular request has completed. For example, the Call Manager 60 issues a "Held" event corresponding to a "Hold Call" request from the ACD subsystem 54 to indicate that the connection specified in the request has been successfully placed on-hold.

Referring back to FIG. 4, the Call Manager 60 is also in communication with the Device Manager 82 to obtain IP addresses and telephone numbers corresponding to device identifiers. In general, the Call Manager 60 requests resolution of an device identifier into an transport address (e.g., IP address or telephone number), and the Device Manager 82 replies with an event specifying the transport address.

The switching component 64 is in communication with the Call Manager 60 and the Call Control 68. The switching component 64 receives events from the Call Control 68 and forwards the events to the Call Manager 60, and receives commands from the Call Manager 60 and forwards such commands to the Call Control 68. The switching component 64 includes a switch interface 66 that provides functions by which the switching component 64 sends events to and receives commands from the Call Manager 60. Commands include:

- a "Place Call" command to instruct the switching component 64 establish a connection to the specified endpoint;
- an "Accept Call" command to instruct the switching component 64 to answer a call in response to an Incoming Call event (described below);
- a "Barge in" command to instruct the switching component 64 to transmit media generated by an endpoint that was previously connected to a conference for silent monitoring of that conference;
- a "Reject Call" command to disconnect a connection in response to an Incoming Call event;
- a "Release Call" command to disconnect an established connection;
- a "Conference Mute" command to instruct the switching component 64 to toggle between preventing and allowing audio to be transmitted to the specified connection during a specified conference call;
- a "Connect Media" command to send pre-recorded audio and video media to a specified connection; and
- a "Disconnect Media" command to disassociate the media player 86 from a specified connection.

Switching component 64 generated events include:

- an "Incoming Call" event to indicate to the Call Manager 60 when an incoming call is received by the switching component 64;
- a "Call Cleared" event to indicate to the Call Manager 60 that a party to an end-to-end conference has hung up;
- a "Barge in" event to indicate to the Call Manager 60 that a connection that was silently monitoring a conference has successfully joined the conference to produce a three-way conference;
- a "Call Failed" event to indicate to the Call Manager 60 failure to establish a connection to an endpoint;
- a "Conference Mute" event to indicate to the Call Manager 60 completion of the conference mute request;
- a "Connect Media" command to send pre-recorded audio and video media to a specified connection; and
- a "Media Completed" event to indicate to the Call Manager 60 that the media player 86 has completed playing the media specified in a previous Connect Media command.

Party Hangs Up

Figure 7:
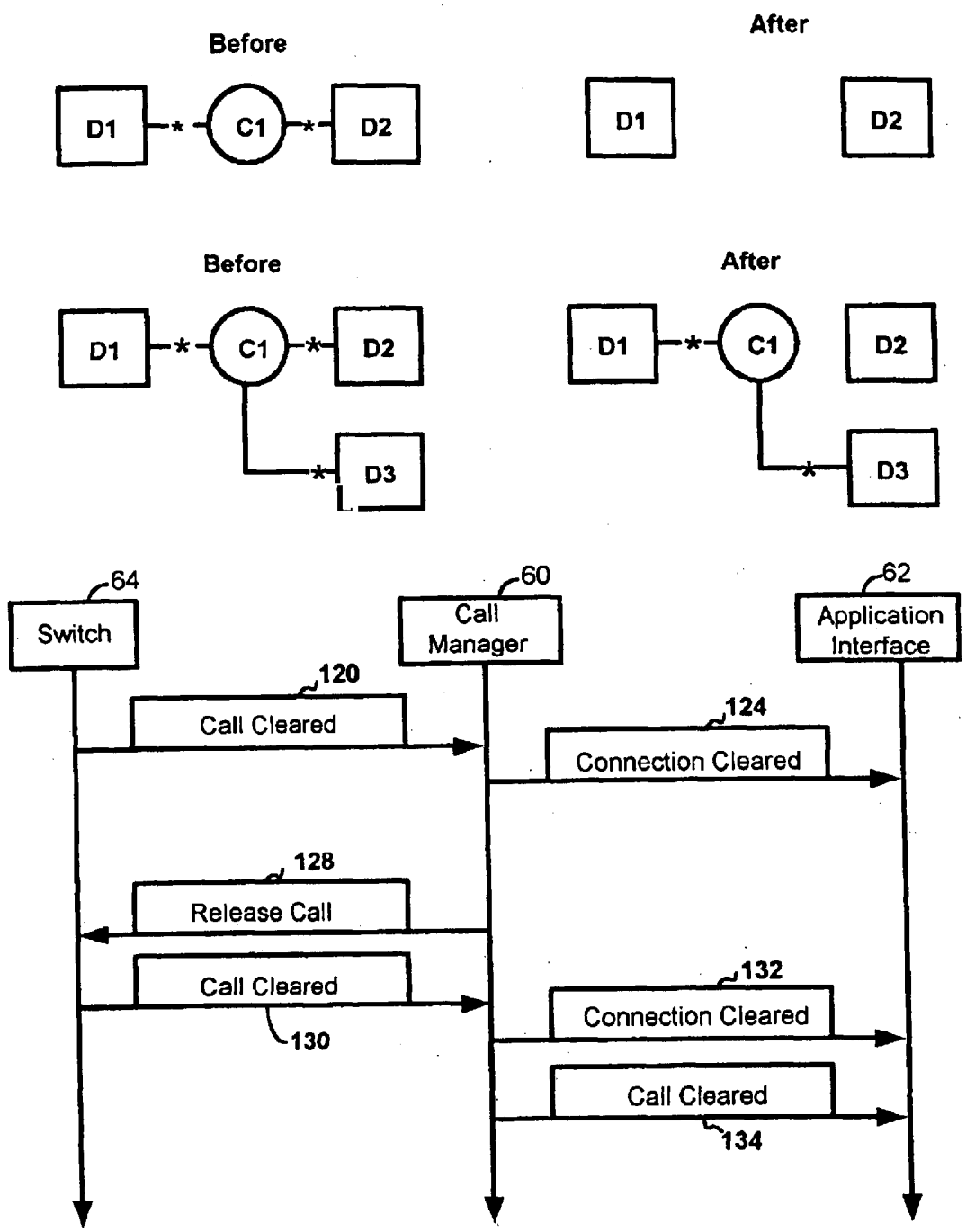
FIG. 7 is a flow diagram of a process that the call processing subsystem uses to clear a connection when the caller hangs up.

FIG. 7 shows an exemplary process by which the H.323 switch 50 clears a connection when a party to a conference hangs up. The switching component 64 sends (step 120) a Call Cleared event to the Call Manager 60. The Call Manager 60 responds by sending (step 124) a Connection Cleared event to the application interface 62. If the conference is a two-party call, the Call Manager 60 returns (step 128) a Release Call command to the switching component 64 to release the other connection. The switching component 64 responds to the Release Call command by sending (step 130) a Call Cleared event to the Call Manager 60 upon disconnecting the other connection. The Call Manager 60 then issues (steps 132 and 134) to the application interface 62 a second Connection Cleared event followed by a Call Cleared event.

Agent Hang Up

Figure 8:
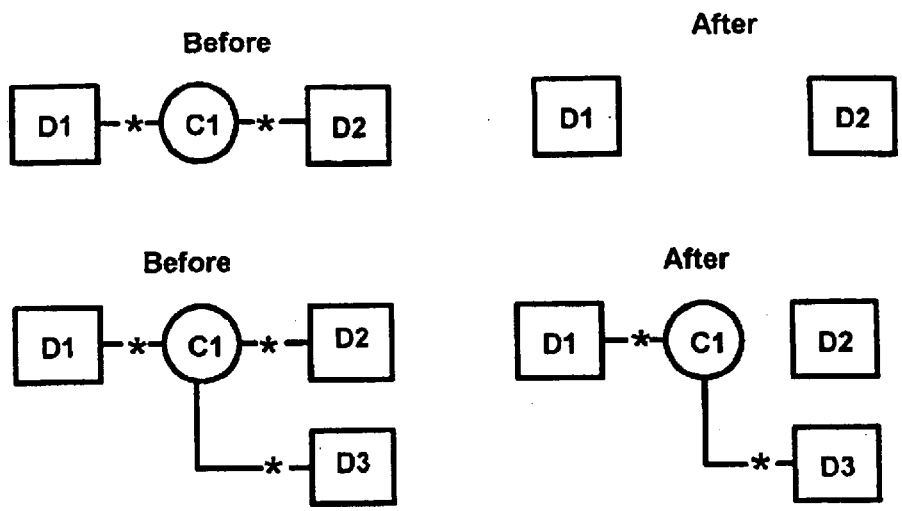
FIG. 8 is a flow diagram of a process that the call processing subsystem uses to clear a connection when the agent system ends the conference.
Figure 8:
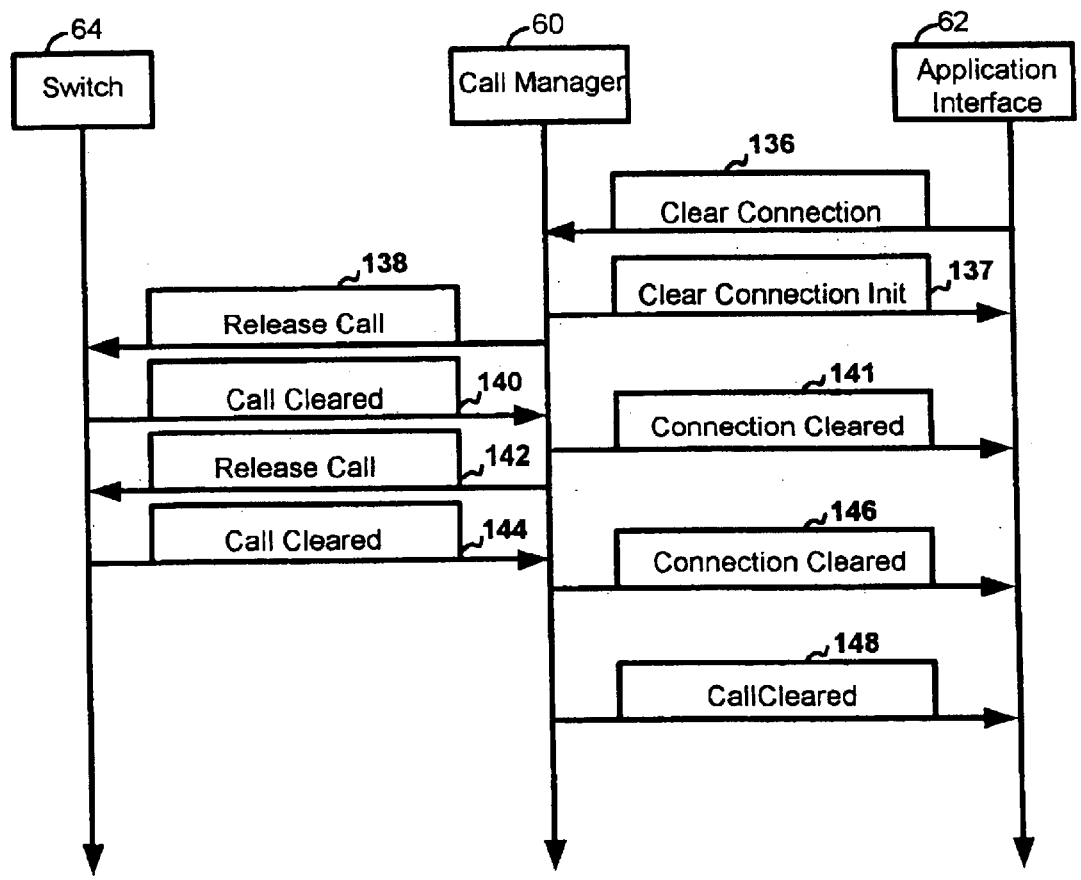

FIG. 8 is a flow diagram of a process by which the H.323 switch 50 clears a connection when the agent system ends a two-party conference. The application interface 62 sends (step 136) a Clear Connection event to the Call Manager 60. In response, the Call Manager 60 issues (step 138) a Release Call command to the switching component 64 and returns (step 137) a Clear Connection Init event to the application interface 62. The switch 50 replies (step 140) to the Release Call command by returning a Call Cleared event to the Call Manager 60 upon disconnecting one of the endpoints in the conference. The Call Manager 60 then issues (step 142) a second Release Call command to the switching component 64 corresponding to the other of the endpoints in the conference. The Call Manager 60 also reports (step 141) the disconnection to the application interface. The switching component 64 replies (step 144) with a Call Cleared event when the other endpoint is disconnected. The Call Manager 60 then sends (steps 146 and 148) the application interface 62 another Connection Cleared event followed by a Call Cleared event.

Establish Incoming Call

Figure 9:
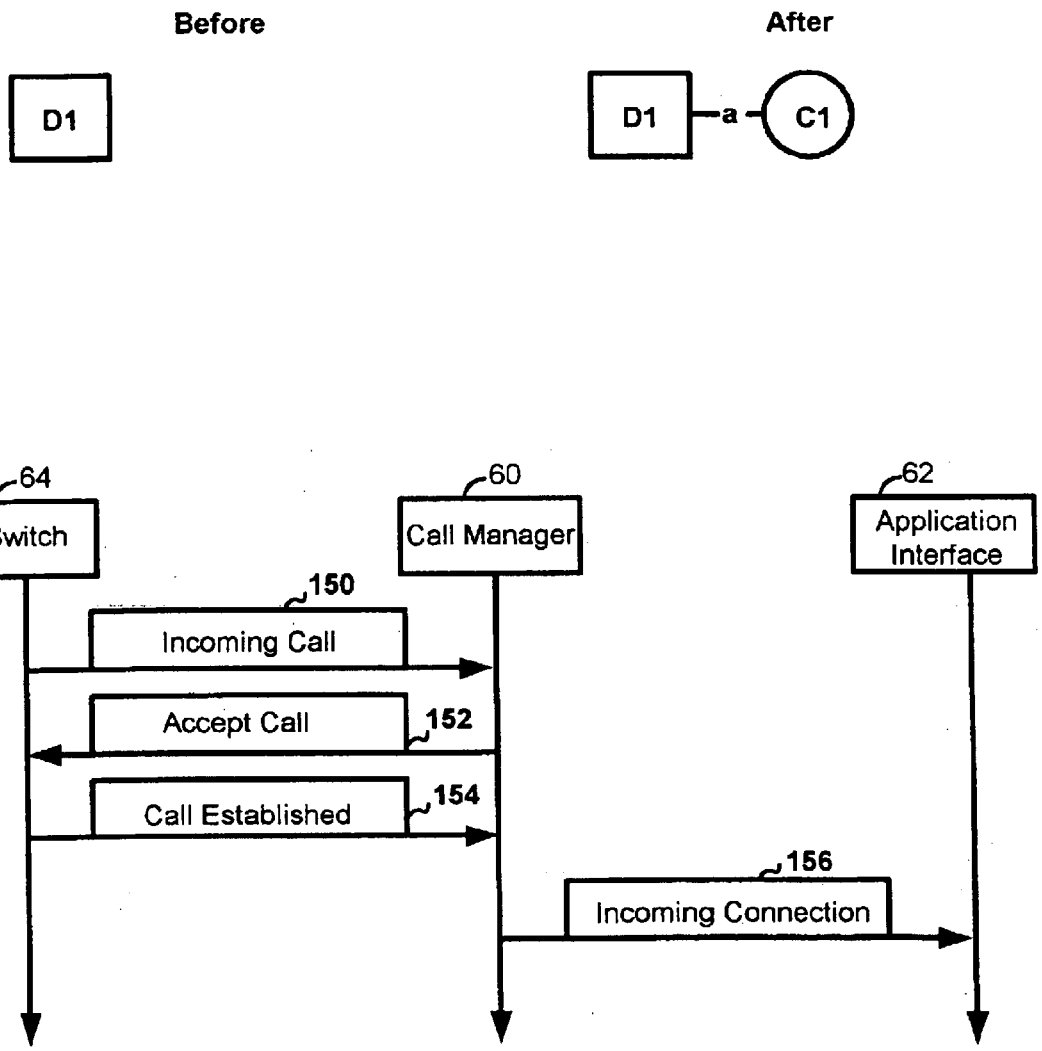
FIG. 9 is a flow diagram of a process that the call processing subsystem uses to handle an incoming call from an endpoint.

FIG. 9 shows an exemplary process by which the H.323 switch 50 accepts an incoming call to establish a connection between the caller 14 and the switch 50. The switching component 64 sends (step 150) an Incoming Call event to the Call Manager 60 upon detecting an incoming call. Upon validating the incoming call, the Call Manager 60 replies (step 152) with an Accept Call command. The switching component 64 establishes the connection with the caller and reports (step 154) the event to the Call Manager 60. The Call Manager 60 then reports (step 156) the established connection by directing an Incoming Connection event to the application interface 62. The switching component 64 then holds the call until the ACD subsystem 54 instructs the switching component 64 to route the call to the available agent system.

Placing a Connection On-hold

Figure 10:
FIG. 10 is a flow diagram of a process that the call processing subsystem uses to place a call on-hold.
Figure 10:
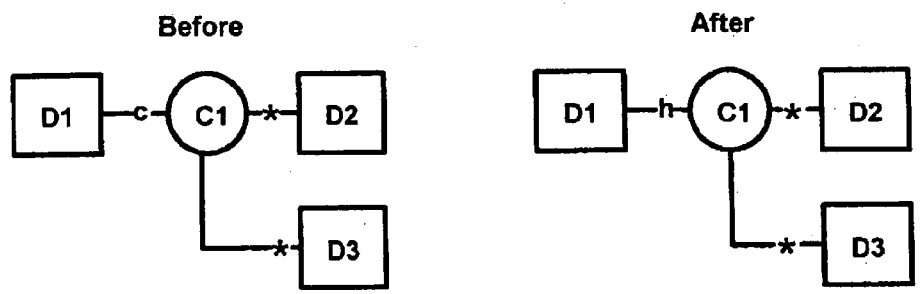
Figure 10:
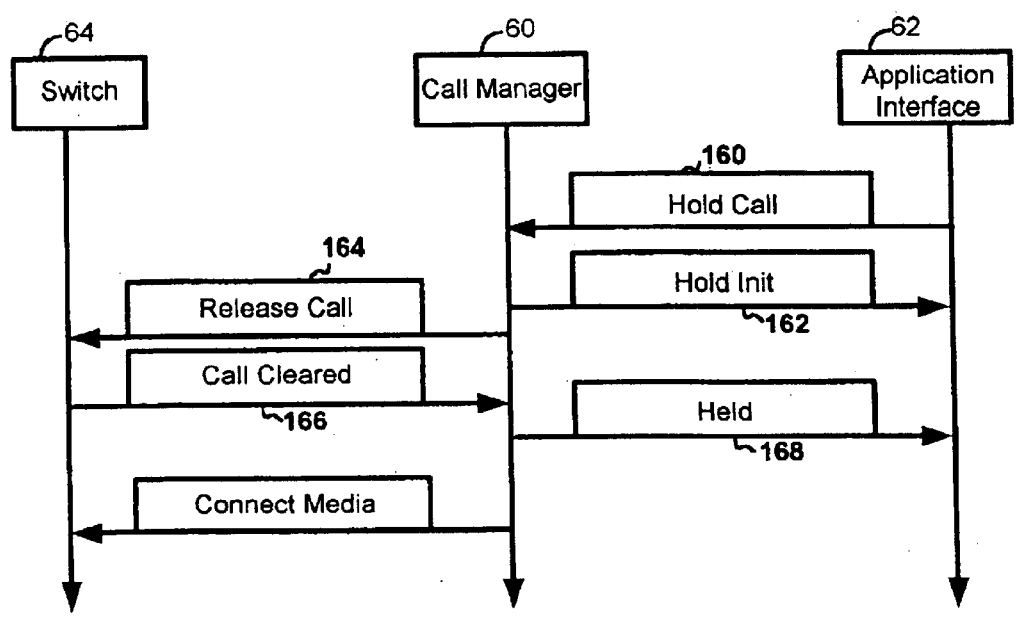

FIG. 10 shows an exemplary process by which the H.323 switch 50 places a connection on-hold. The Call Manager 60 receives (step 160) a Hold Call command from the application interface 62. The Call Manager 60 replies (step 162) to the Hold Call command with a Hold Init event and by sending (step 164) a Release Call command to the switching component 64. Upon disconnecting the connection specified in the Release Call, the switching component 64 sends (step 166) a Call Cleared event to the Call Manager 60, which the Call Manager 60 reports by sending (step 168) a Held event to the application interface 62. The Call Manager 60 can then issue a Connect Media command to the switching component 64 if the held connection is one party of a two-party conference and media was specified for held connections.

Retreving a Call On Hold

Figure 11:
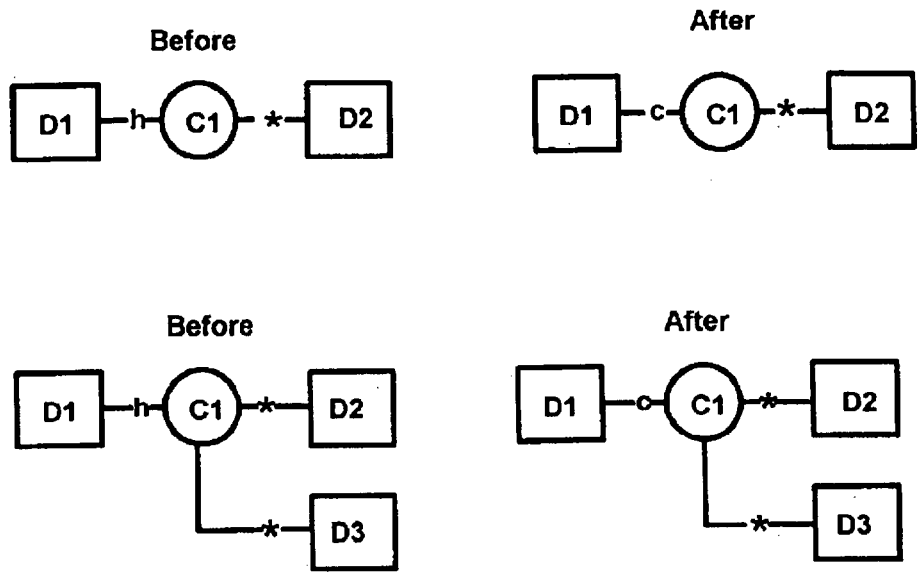
FIG. 11 is a flow diagram of a process that the call processing subsystem uses to retrieve a connection that has been previously placed on-hold.
Figure 11:
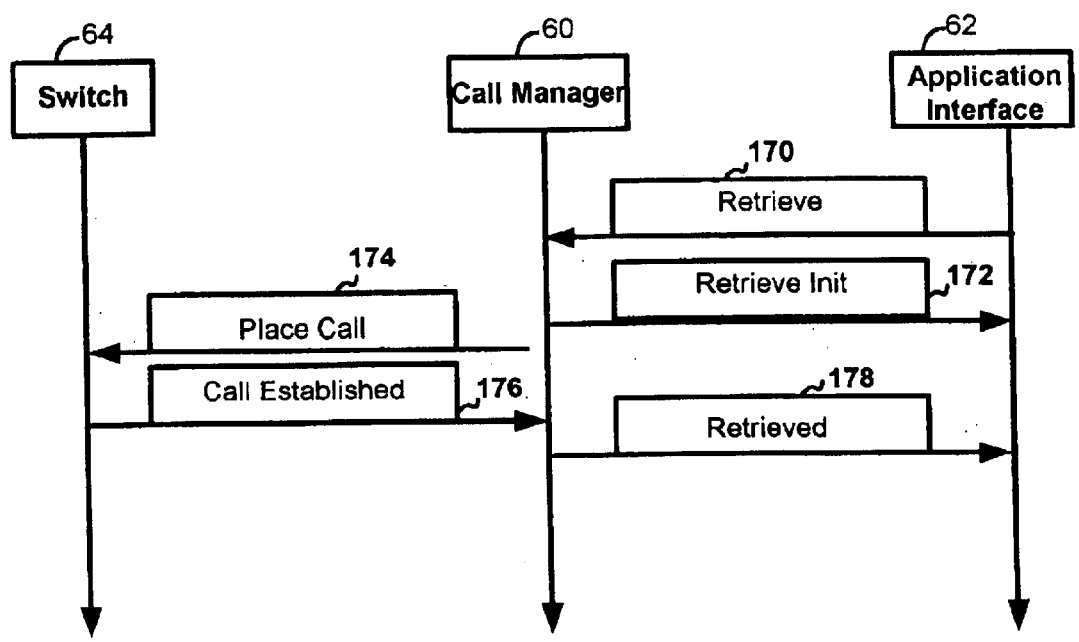

FIG. 11 shows an exemplary process by which the H.323 switch 50 retrieves a connection that has been previously placed on-hold. The Call Manager 60 receives (step 170) a Retrieve Call command from the application interface 62. In reply to the Retrieve Call command, the Call Manager 60 sends (step 172) a Retrieve Init event to the application interface 62 and sends a Place Call command to the switching component 64. The Place Call command specifies the connection to reconnect to the connection placed on hold. Upon establishing the specified connection, the switching component 64 sends (step 178) a Retrieved Event to the Call Manager 60.

Figure 12A:
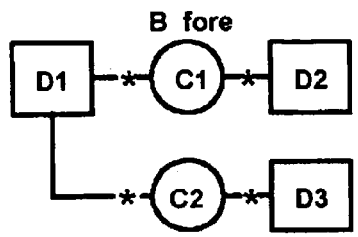
FIG. 12 is a flow diagram of a process that the call processing subsystem uses to place three endpoints into a multi-point conference.
Figure 12B:
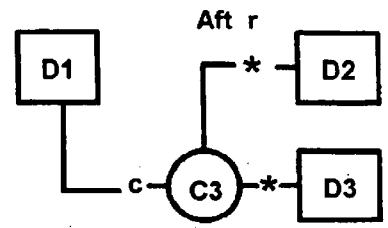
Figure 12C:
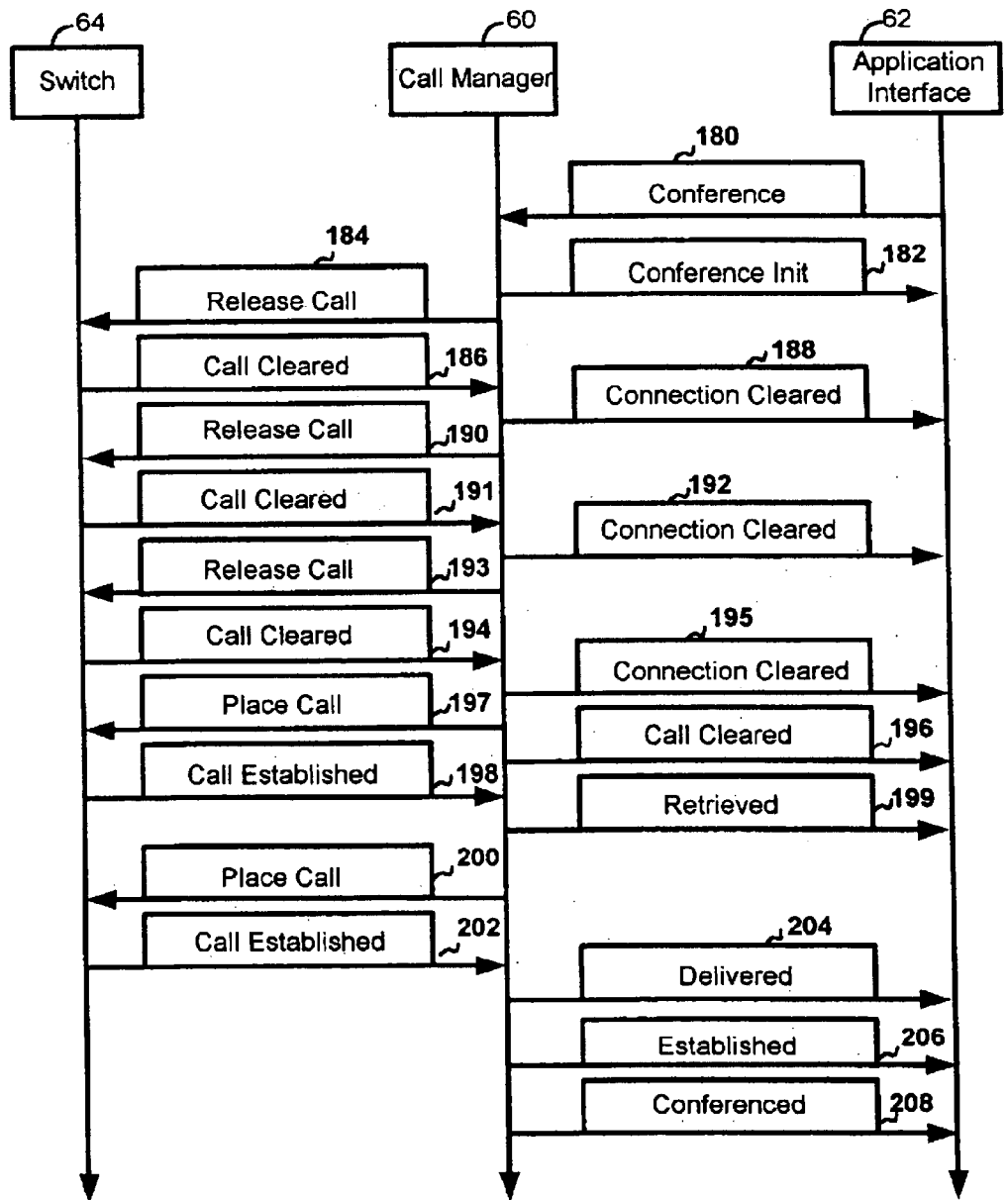

FIGS. 12A, 12B, and 12C show an exemplary process by which the H.323 switch 50 establishes a three-party conference call. Initially one endpoint D1 is engaged in two different calls C1, C2 with two different endpoints D2 and D3, respectively. The Call Manager 60 receives (step 180) a conference command from the application interface 62. The Call Manager 60 replies (step 182) to the Conference command with a Conference Init event to the application interface 62. To establish the conference call, the process selects one of the existing calls to retain continuously throughout the conferencing process and to build the conference call around that call. The selected call can be active or logical. In this example, the selected call is C1.

If a silent monitor connection is present, the Call Manager 60 issues (step 184) a Release Call command to the switching component 64. The Release Call command specifies the silent monitor connection. Upon releasing the specified connection, the switching component 64 sends (step 186) a Call Cleared event to the Call Manager 60, and the Call Manager 60 sends (step 188) a Called Cleared event to the application interface 62.

Performing a clear connection process, described above, disconnects (steps 190) both endpoints D1, D3 to the other of the two calls (i.e., C2). Consequently, one call C1 remains between the two endpoints D1 and D2, and the third endpoint D3 is disconnected. If one of these two remaining endpoints D1, D2 has a connection that is on-hold, the Call Manager 60 and switching component 64 retrieve (steps 196, 197, and 198) the connection as described above in FIG. 11. The Call Manager 60 then sends (step 200) a Place Call command to the switching component 64 to establish a connection with the third endpoint D3. The switching component 64 responds (step 202) with a Call Established event upon establishing the connection with the third endpoint D3. In steps 204, 206, and 208, the Call Manager 60 notifies the application interface 62 that the call to the third endpoint is delivered, established, and placed in conference, respectively.

Call Control

Referring back to FIG. 4, the call control component 68 is in communication with the switching component 64 and with the protocol stack 72. The Call Control 68 interfaces with the switching component 64 using the same command and event messages as those exchanged between the switching component 64 and the Call Manager 60. The operations performed by the Call Control 68 provide PSTN-like and PBX-like functionality for conducting multimedia Internet telephone conferences. In response to commands received from the switching component 64, the Call Control 68 performs the hold, retrieve, transfer, conferencing, muting, silent monitoring, and barging-in operations described above. The Call Control 68 also issues event messages through the switch interface 66 to inform the Call Manager 60 of the current state of connections and the status of command processing.

The Call Control 68 also provides call setup and control for conferences with one or more endpoints. In general, the Call Control 68 receives incoming calls, notifies the Call Manager 60 of such event, and under the direction of the ACD subsystem 54, accepts the call, and places calls to other endpoints. The Call Control 68 coordinates activities among the H.245, Q.931, T.120, Media Stream Router, and Media Player components to perform the processing required by the call.

Protocol stack 72 includes an H.225 component 92, a Q.931 component 94, an H.245 component 96, a T.120 component 98, and a media stream router 100. The Q.931 component 94, the H.245 component 96, and the T.120 component 98 are collectively referred to as a H.323 stack.

The H.225 component 92 is an implementation of the standard H.225 protocol for communication between the Device Manager 82 and the Winsock stack 80. The H.225 protocol provides for H.323 call setup.

The Q.931 component 94 is the protocol for the H.225 and provides the interface for performing the call setup of the H.323 calls. Q.931 is ISDN's (Integrated Services Digital Network) connection control protocol. In general, Q.931 manages connection setup and breakdown. The Q.931 component 94 listens for incoming calls on the Q.931 well-known TSAP address and notifies Call Control 68 of incoming call events. Here, the Q.931 component 94 is compliant with H.323 Version 2 protocols. The Q.931 component 94 also delivers to the Call Control 68 the remote extension address, destination address information, or source IP address on call setup.

Other functions of the Q.931 component include initiating a call disconnect, determining when an endpoint disconnects a call, negotiating with a remote H.323 endpoint regarding an H.245 channel over which the H.323 call control protocol is exchanged, and holding incoming calls using a call proceeding message.

The H.245 component 96 is a full implementation of the standard H.245 protocol for H.323, Version 2.0. The H323 standard, Version 2.0, is described in "A Primer on the H.323 Series Standard," by DataBeam, and is incorporated by reference herein. The H.245 standard is described in the ITU-Recommendation H.245, Revision 2 (Jun. 4, 1996), "Control Protocol for Multimedia Communication" also incorporated by reference herein.

To allow for the hold, retrieve, transfer, conference, muting, monitoring, and barging in functionality, the H.245 component 96 provides full H.323 endpoint functionality. The H.245 component 96 performs master/slave determination, capability exchange, and logical channel management with each endpoint when connecting that endpoint to the H.323 switch 50.

The T.120 component 98 provides the T.120 Data Media Processing functionality. An interface to this component is described in "A Primer on the T.120 Series Standard," published by Databeam and incorporated by reference herein. All conferencing data is sent to and distributed from this T.120 component 98. The T.120 component 98 connects endpoints within a call to a single T.120 conference when supported by each endpoint.

The media stream router (MSR) 100 is in communication with the Call Control 68, Media Player 86, and the Winsock stack 80 to provide processing of audio and video streams for connections within a conference. The MSR 100 includes an interface for use by the Call Control 68 to add and remove audio and video streams for calls within the conference.

The MSR 100 performs any required manipulation of the media streams. For audio streams, the MSR 100 discards media received from an endpoint when that endpoint is the only call in a conference. The MSR 100 also can prevent audio from being sent to an indicated endpoint within a conference (e.g., during a mute operation).

For an endpoint-to-endpoint conference, the MSR 100 reads and forwards media packets between the two endpoints. In a multi-endpoint conference (i.e., a conference with more than two endpoints), the MSR 100 can mix the audio from the multiple endpoints or switch the audio based on level detection. Switching audio streams can be based on energy detection (e.g., switching to the audio stream with the loudest speaker in a three-way conference call and squelching the audio of the others in the conference until the loudest speaker stops speaking).

Because mixing requires more CPU processing than switching, the Call Control 68 can use audio switching depending on the system load. If an endpoint leaves the multi-point conference, the MSR 100 adjusts so that the remaining two endpoints hear each other. The MSR 100 mixes RTP (Real-Time Transport Protocol) and RTCP (RTP control protocol) information when processing audio streams. RTP is an Internet-standard protocol for transport of real-time audio and video. RTCP is RTP with a control component.

For video streams, the Call Control 68 determines which video is seen by each endpoint in a conference and the MSR 100 delivers the video according to this determination. The H.245WS Component 76 is an interface for receiving and transmitting protocol messages between the Q.931 and H.245 components and the Winsock API 80. The component 76 detects incoming connections and termination of connections. The Winsock API 80 provides the TCP/IP connectivity needed to exchange Q.931 and H.245 call control protocols.

The media player component 86 is in communication with the MSR 100 for transmitting o audio and video media to an endpoint that is on-hold or waiting for a connection to one of the agent systems 18. The media player 86 assures synchronization of the audio and video streams and that the audio and video are of the appropriate type for the logical channels that are open to the endpoint receiving the media (e.g., G.723, G.711, etc.). Calls can be added or removed while media is playing.

The Device Manager 82 shown in FIG. 4 is in communication with the Call Manager 60 and the H.225 stack component 92 and includes two modes of operation. One mode of operation of the Device Manager 82 is to operate as a full H.323 Gatekeeper entity. In this mode, the Device Manager supports all H.323 Version 2.0 Gatekeeper functionality and messaging, including endpoint registration and bandwidth management. Another mode of operation is as an H.323 endpoint that registers with an external (to the ACD 56) h.323 gatekeeper. In this mode, the Device Manager supports messaging to the external gatekeeper, including registration and Admission requests. In one embodiment, the Device Manager 82 operates in both modes, managing registered endpoints as an H.323 Gatekeeper, and allowing an external gatekeeper to control call with unregistered endpoints.

The Device Manager 82 provides address resolution for device identifiers and user aliases for all devices known to the ACD 56. A Register Device request informs the Device Manager 82 of a new entry to track for address resolution. Typically, registration occurs when a device logs in or during system initialization. A Resolve Address request obtains the device address information previously registered. The information is returned via the Address Response event sent to the specified interface.

Figure 13:
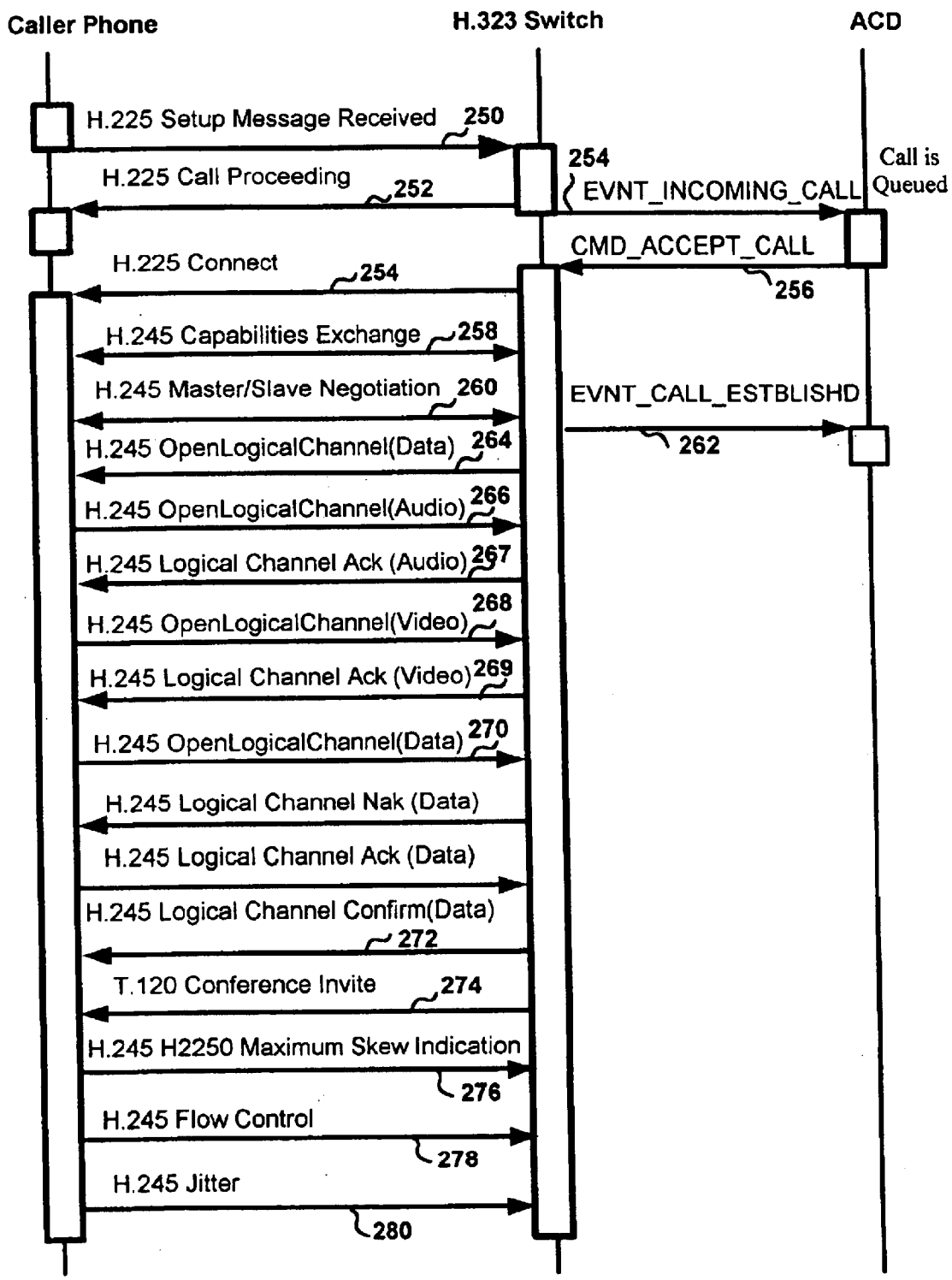
FIG. 13 is a flow diagram of a process that the caller uses to exchange protocol packets with the call processing subsystem to establish a call.

FIG. 13 shows in more detail an exemplary process by which the H.323 switch 50 establishes a call between the caller system 14 and the H.323 switch 50. In step 250, the caller system 14 sends an H.225 Setup message to the H.323 switch 50. The Call Control 68 of the H.323 switch 50 (in the CP subsystem 50) uses the Q.931 component 94 to listen on the H.225 well-known TSAP. When the switch 50 receives the Setup message, the Call Control 68 directs the Q.931 component 94 to respond (step 252) with a H.225 Call Proceeding message. This turns off a timer, giving the Call Control 68 sufficient time to notify that the ACD subsystem 54 that an incoming call is waiting for acceptance or rejection. Consequently, the Call Control 68 can receive incoming calls without answering until directed by the ACD subsystem 54. In step 254, the switch 50 sends an Incoming Call event to the ACD subsystem 54.

Upon delivering the incoming call to the ACD subsystem 54, the Call Control 68 also provides information related to incoming call. For example, this information can be the source IP Address, a remote extension address, destination information, and call context. The Q.931 component 94 obtains this information upon receiving the H.225 Setup message and forwards the information to the Call Control 68

If so directed by the ACD subsystem 54, the Call Control 68 can reject the incoming call. With the incoming call in the Call Proceeding state, the Call Control 68 directs the Q.931 component 94 to release the call. The Q.931 component 94 returns a H.225 Release Complete message to the caller system 14 to terminate the H.225 protocol exchange and the incoming call.

Alternatively, the ACD subsystem 54 can direct (step 256) the switch 50 to accept the incoming call. Consequently, the Call Control 68 completes the Q.931 messaging by transmitting (step 258) an H.225 Connect message to the caller system 14. Accordingly, the Q.931 component 94 connects the incoming call to the Call Control 68. The Call Control 68 then initializes the T.120 layer and the H.245 layer with system-defined capabilities. In one embodiment, such system-defined capabilities are the intersection of capabilities supported by all agent systems 18.

The H.245 component 96 then performs (steps 256 and 260) an exchange of media capabilities, master/slave negotiation, and logical channel signaling for incoming media streams with the caller system 14. During the capabilities exchange, the switch 50 determines a set of media capabilities that can be used by the caller system 14 during the call. Upon successful exchange and negotiation, the switch 50 transmits (step 262) a Call Established event to the Call Manager 60.

In step 264, the switching component 64 transmits a H.245 data Open Logical Channel (OLC) message to the caller system 14. The caller system 14 sends (steps 266 and 268) H.245 audio and video Open Logical Channel messages to the switch 50. The switch 50 acknowledges (steps 267 and 269) the OLC messages and stores the OLC information.

During this process, information about the remote endpoint (i.e., the caller system 14), including the media information and capabilities, is stored for use when establishing any future calls placed in the conference. The switch 50 receives and confirms (steps 270 and 272) a data OLC from the caller system 14. In step 274, the switch 50 sends a T.120 invite message to the caller system 14. Subsequently, the switch 50 receives (Steps 276, 278, and 280) additional H.245 protocol messages from the caller system 14 to control the subsequent transmission of packets corresponding to the multimedia call.

After establishing the incoming call, the Call Control 68 notifies the MSR 100 to handle any incoming audio and video streams from the caller system 14 and the T.120 component 98 to handle the data streams. Further, the Call Control 68 notifies the Call Manager 60 of the success or failure in processing the call.

Figure 14:
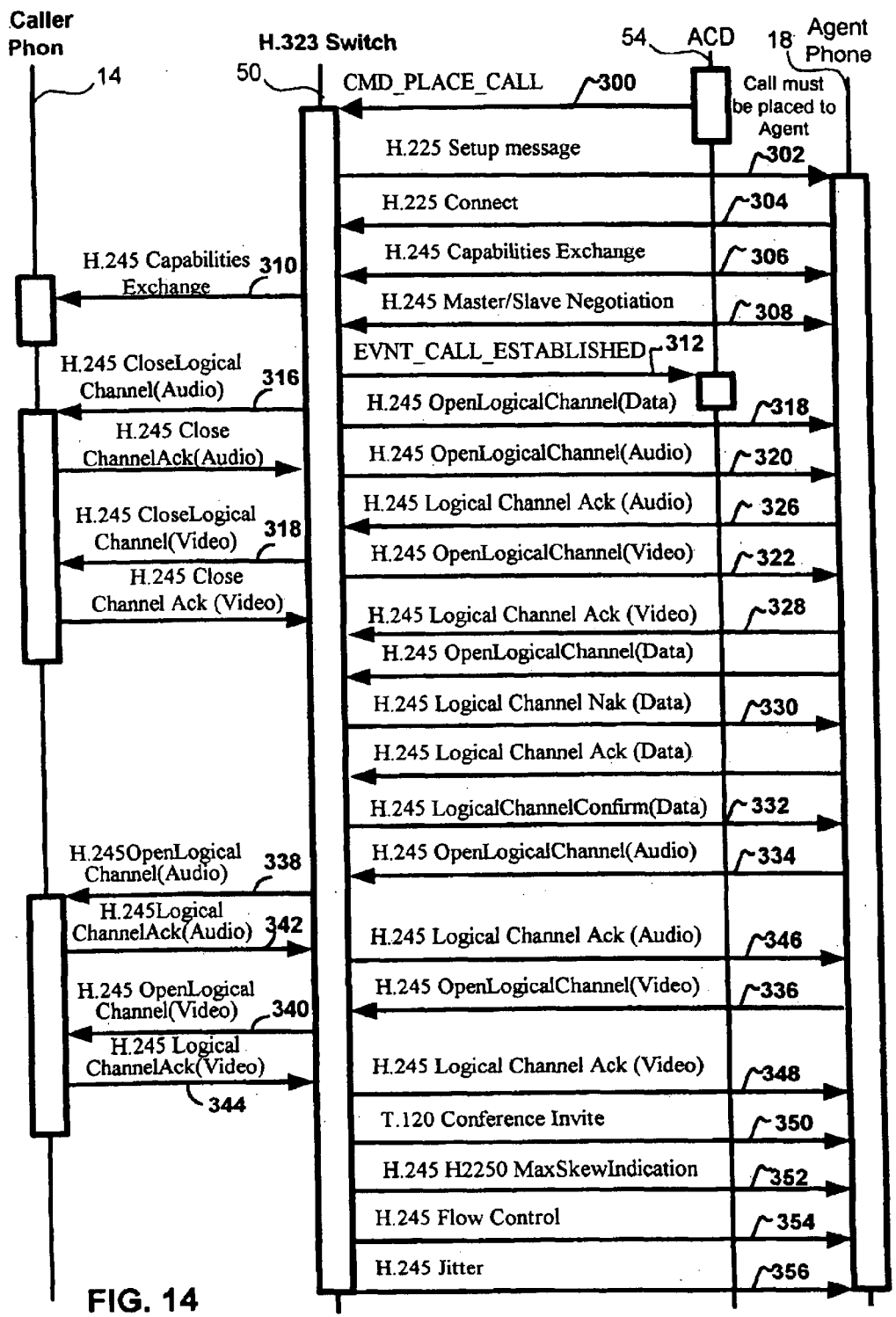
FIG. 14 is a flow diagram of a process that the call processing subsystem uses to place a call to the agent system to establish a conference with the caller system.

FIG. 14 shows in more detail the process of placing a second call to the agent system 18 to establish a conference between the caller and agent systems 14, 18. In response to the Call Established event of FIG. 13, the ACD subsystem 54 issues (step 300) a Place Call command to the Call Manager 60 of the switch 50. The command indicates to the Call Manager 60 that the incoming call should be placed to one of the agent systems 18 (i.e., an Internet telephone) at a specified IP Address/Q.931 Port Number within a specified conference. The specified conference can be an existing conference or a new conference. In response, the Call Control 68 uses the Q.931 component 94 to initiate the call by transmitting (step 302) an H.225 Setup message to the agent system 18.

The agent system 18 responds to the H.225 Setup message by sending (step 304) an H.225 connect message to the caller system 14. The Call Control 68 then uses the H.245 component 96 to establish the call control channel with the agent system 18. The information stored about the caller system 14 is used by the Call Control 68 to perform an exchange of capabilities, master/slave negotiation, and logical channel signaling with the agent system 18 (steps 306 and 308). By exchanging the capabilities of the caller system 14 with the agent system 18, the switching component 64 can force all endpoints to use the same type of audio and video media.

In one embodiment, the switching component 64 forwards 310 the capabilities of the agent system 18 to the caller system 14. In another embodiment, the switching component 64 compares the capabilities of the agent system 18 with the capabilities determined from a similar exchange with the caller system 14 to determine whether there are incompatibilities. If so, the switching component 64 can terminate the call. Upon successful exchange and negotiation, the switching component 64 transmits (step 312) a Call Established event to the Call Manager 60 for delivery to the ACD subsystem 54.

The Call Control 68 notifies the MSR 100 and the T.120 component 98 about the new media requirements within the conference, including support for silent monitoring of other calls in the conference. Notification passes to the Call Manager 60 after the call is either established with the agent system 18 or fails to connect.

In steps 314 and 316, the switch 50 sends H.245 messages to the caller system 14 to close all media Logical Channels opened previously with the caller system 14.

In steps 318, 320, and 322, the switch 50 transmits a H.245 Open Logical Channel (OLC) message to the agent system 18 for each open channel from the caller, along with a T.120 channel. The switch 50 receives (Steps 326, 328, and 330) an acknowledgment from the agent system 18 for each Open Logical Channel and updates the MSR 100 accordingly. The switch 50 confirms (step 332) a data OLC from the agent system 18.

In steps 334 and 336, the switch 50 receives H.245 audio and video Open Logical Channel messages from the agent system 18, which the switch 50 forwards (steps 338 and 340, respectively) to the caller system 14. The caller system 14 replies (steps 342 and 344) to the switch 50 with corresponding H.245 Logical Channel acknowledgments, which the switch 50 forwards (step 346 and 348, respectively) to the agent system 18 and updates the MSR 100. In step 350, the switch 50 sends a T.120 Conference Invite message to the agent system 18.

Subsequently, the switch 50 transmits to the agent system 18 (steps 352, 354, and 356) those additional H.245 protocol messages received from the caller system 14 for controlling the subsequent transmission of packets corresponding to the multimedia call.

Disconnection

When the ACD subsystem 54 requests that a call within a conference be disconnected, the Call Control 68 notifies the H.245 component 96 to signal the remote endpoint that the call is terminated and the Q.931, MSR, and T.120 components to close the media channels. The Call Control 68 notifies the Call Manager 60 after the call is terminated. If after the call is disconnected another call remains in the conference, the Call Control 68 freezes the video sent to that endpoint and may exchange capabilities with that endpoint to indicate that there are no receive capabilities.

The Call Control 68 uses both the Q.931 and H.245 components to detect when a remote endpoint disconnects and cleans up the disconnected call without adversely affecting any other calls in the conference. Again, if one call remains in the conference, the Call Control 68 freezes the video sent to that endpoint and exchanges capabilities with that endpoint to indicate that there are no receive capabilities. The Call Manager 60 is notified after the call is disconnected.

When the ACD subsystem 54 requests that a third call be placed into an existing conference, the Call Control 68 uses the Q.931 component 94 to set up the third call and the H.245 component 96 to establish the call control channel. New logical channels are opened with the new endpoint associated with the third call. The Call Control 68 uses the MSR 100 to perform the three-way multi-point functionality and notifies the Call Manager 60 after the third call is connected to the existing conference.

For video streams, the Call Control 68 specifies to the MSR 100 the video stream that each endpoint in a multipoint conference receives. In one embodiment corresponding to typical ACD functionality, the caller sees an assigned agent, and the assigned agent and supervisor agent both see the caller. In one embodiment, the Call Control 68 assumes that the oldest call in the conference is the caller, the next oldest is the assigned agent, and the most recent is the supervisor.

When the ACD Subsystem 54 requests that the audio of a specified call not be heard by all other calls in a conference, the Call Control 68 blocks all conference audio from being heard by the specified call. The Call Control 68 uses the MSR 100 to perform this muting functionality.

The Call Control 68 operates as a T.120 Node Controller to provide T.120 data sharing within the context of H.323 multi-point conferences. The T.120 component 98 is a complete T.120 stack, thus providing Call Control 68 with the ability to function as the Node Controller. As the Node Controller, the Call Control 68 becomes the top provider (i.e., controller of the routing of the T.120 data for the conference) so that all T.120 information goes through the H.323 switch 50.

In one embodiment, the Call Control 68 instructs the Media Player 86 to send stored audio and video media to a specified call. This function involves setting up logical channels to the target endpoint to receive the media. The function also sets up the Media Player 86 to open each media file specified and to present the media to the target endpoint by sending packets as needed.

The Call Control 68 also supports the selection of a source of video media for an endpoint. In a three-party conference, the Call Manager 60 can relay the request for one call to receive the video from a specified call. This allows an endpoint to switch between seeing one person or another as desired.

Automatic Call Distribution (ACD)

Figure 15:
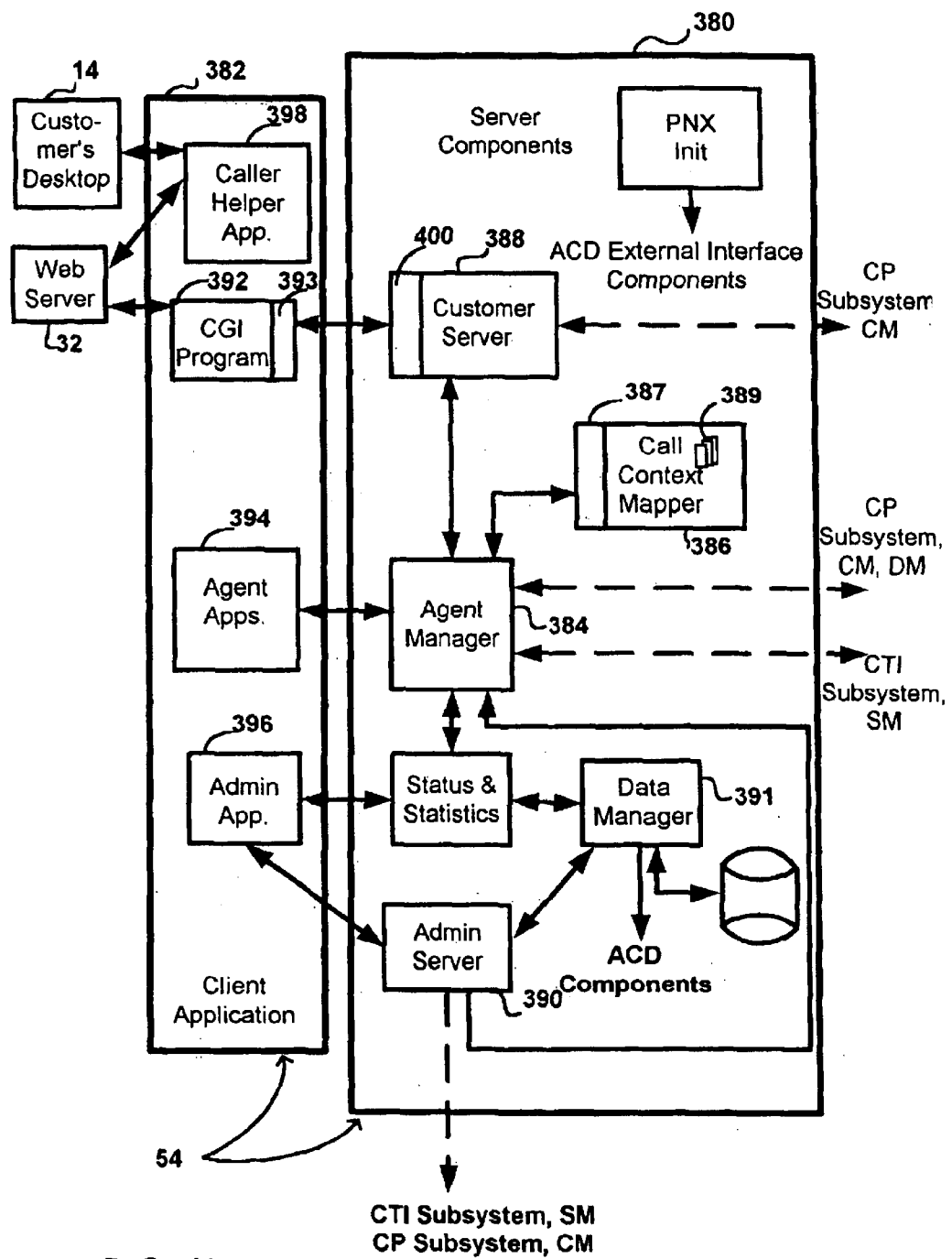
FIG. 15 is a block diagram of the software components for the ACD subsystem component of the software installed on the server system.

FIG. 15 shows an exemplary embodiment of the ACD subsystem 54 having server software components 380 that reside on the server system 30 and client software components 382 that reside on remote systems (i.e., caller and agent systems). The server components 380 include an Agent Manager 384, a Call Context Mapper 386, a Customer Server component 388, an Administration Server component 390, and a Data Manager 391. The client software components 382 include a CGI program 392, Agent Application 394, an Administration Application 396, and a Caller Helper Application 398. The server components 380 communicate with the client components 382. The client components 382 provide the GUI to the users of the caller and agent systems 14, 18, taking requests from the users and responding with notices of ACD activity.

Call Context Mapper

The Call Context Mapper 386 is in communication with the Agent Manager 384 to determine the actions to perform on calls into the ACD 56 at the direction of Agent Manager 384. The Call Context Mapper 386 includes a program interface 387 through which the Agent Manager 384 issues requests to control the operations performed by the Call Context Mapper 386. In response to the requests received from the Agent Manager 384, the Call Context Mapper 386 generates events indicating those actions to perform. The requests appear in Table 1; the events in Table 2.

TABLE 1

Call Context Mapper Requests

| Requests | Description |
| --- | --- |
| GenerateActions | This request directs the Call Context Mapper 386 to traverse the tables 389 and call the action event methods. The Call Context Mapper 386 validates the Call Context data before returning. A message id is returned from this request which correlates to the event actions that is generated. |
| PauseActions | This request pauses the Call Context Mapper 386 at a point in the mapping process. Takes the message id returned from the Generate Actions request |
| ContinueActions | This request continues the mapping process. |
| StopActions | This request terminates the mapping of Call Context data to actions. |

TABLE 2

Call Context Mapper Events

| Requests | Description |
| --- | --- |
| CTIRouteRequest | Asks the CTI server 40 for a device to which to route the call. A timeout parameter passed to the Agent Manager 384 indications how long to pause the Call Context Mapper 386. |
| RouteToDevice | Routes the Call to a device (agent or agent group) using a device ID parameter |
| PlayMediaStream | Plays a media stream specified by a file name parameter |
| Display Text Message to Browser | Sends a text message to a caller through the Caller Helper Application 398. The text message is passed as a parameter. |
| Display URL to Browser | Sends a URL to a caller through the Caller Helper application 390. The URL is passed to the action as a parameter |
| Disconnect Caller | Hangs up the caller and to cease routing |

In one embodiment, the Call Context Mapper 386 has three levels of routing tables 389 for mapping callers to agents: a Call Context Mapping table, a Time of Day Routing Table, and an ACD Routing Table. The Call Context Mapping Table maps each call type to a unique Time of Day Routing Table. Each Time of Day Routing Table has one entry pointing to the ACD Routing Table that is used when the call center is opened for the current time of day.

Each agent group is associated with one ACD Routing Table that applies when the call center is opened. An administrator configures the contents of each ACD Routing Table for each agent group. Each ACD Routing Table includes a list of actions to perform for the call. Each action can have associated parameters that further control that action. Examples of actions include:

A CTIRouteRequest action for asking the CTI server 40 for a device to which to route the call.

A RouteToDevice action for routing the call to a device (agent or agent group).

Route to another ACD Routing Table to perform the actions in that routing table.

A PlayMediaStream action for playing a media stream specified by a file name parameter A Display Text Message to Browser for sending a text message to a caller through the Caller Helper Application 398.

A Display URL to Browser for sending a URL to a caller through the Caller Helper application 390.

A Disconnect Caller action for hanging up the caller and to cease routing

If—test some condition and if true, perform some other action. This can be set to test the response code from a previous action (such as route to device) if appropriate, or to test a separate condition.

A Goto action for continuing traversal of the ACD Routing Table using another action.

A Delay action for pausing traversal of the ACD Routing Table.

An End action for ceasing traversal of the ACD Routing Table.

In general, the routing tables 389 operate to place the call in a queue so that the appropriate agent can be found to handle the call. The call type and time of day get the call to the list of actions that can place the call into the appropriate queue. A RoutetoDevice action places the call into the queue. An exemplary ACD Routing Table for each agent group is shown in Table 3. The ACD table is traversed from top to bottom. Each action may or may not be executed depending upon the result of the action taken.

TABLE 3

ACD ROUTING TABLE (CALL CENTER OPEN)

| Actions | Parameter |
|---|---|
| DisplayText | System greeting Text message parameter (if configured). |
| DisplayURL | System greeting URL parameter (if configured) |
| PlayMediaStream | Media stream a file name parameter (if configured). |
| CTIRouteRequest | A timeout parameter (if configured). |
| RouteToDevice | A device ID parameter. |
| If(return code = Device Queue Full) | Label QueueFull |
| Goto | TheEnd |
| LABEL: QueueFull | |
| DisplayText | Waiting in Queue Text message parameter (if configured). |
| DisplayURL | Waiting in Queue URL parameter (if configured) |
| PlayMediaStream | Waiting in Queue Media stream file (if configured). |
| Disconnect Caller | Hangs up the caller and to cease routing |
| LABEL: TheEnd | |
| End | |

Agent Manager (384)

The Agent Manager 384 is in communication with the Customer Server 388, the Agent Application 394, the Call Manager 60 and Device Manager 82 of the H.323 switch 50, the CTI Service Manager of the CTI Subsystem 58 (see FIG. 16), Call Context Mapper 386, Data Manager 391. In general, the Agent Manager 384 includes interfaces for receiving requests from the various software components and for generating events. Table 4 shows an exemplary list of the received requests, and Table 5 shows an exemplary list of the generated events.

TABLE 4

Agent Manager Requests

| Requests | Description |
|---|---|
| REQUESTS FROM AGENT APPLICATION 394: | |
| AgentRegister | Registers the agent with the call center |
| AgentUnregister | Unregister the agent with the call center |
| AgentAvailable | Set agent state to Available |
| AgentUnavailable | Set agent state to Unavailable |
| ConfigureWrapUp | Set Wrap Up Mode |
| AgentWrapUp | Set agent state to wrap up |
| AgentInExternalCall | Indicates that the agent has entered/exited an external Internet telephone call |
| GetAgentGroupList | Get list of agent groups that the agent is a member of. List includes indication of whether the agent is logged in/out of each group |
| ChangeAgentGroups | Request to log in/out of agent groups |
| GetDialList | Get Agent Dial List |
| DialAgent | Dial out to the agent |
| DialOutside Domain | Dial outside of the switching domain |
| GetCallTypes | Get call type List |
| TransferToCallType | Transfer call to call type |
| Hold | Put call on hold |
| Retrieve | Retrieve call |
| Toggle | Toggle active and held call |
| Transfer | Transfer one call to another |
| Conference | Conference in the two calls |
| Conference Mute | Mute the conference call |
| CallWaitingResponse | Response to call waiting indication |

TABLE 4-continued

Agent Manager Requests

| Requests | Description |
|---|---|
| REQUESTS FROM CTI SUBSYSTEM 58: | |
| Query Device | Query the agent state(s). Device ID can be one device id or an indication that ALL device ids should be queried |
| Set Feature | Set agent state. Agent State: Agent Logged On, Agent Logged Off, Agent Not Ready, Agent Ready, Agent Working After Call. |
| REQUESTS FROM CUSTOMER SERVER 388: | |
| RouteOutgoingCall | Find a route to an agent for an outgoing call request. This comes from the Customer Server component. Once a route is found, the call is placed out to the caller. |
| GetQPosition | Return the queue position for the customer call |

TABLE 5

Agent Manager Events

| Events | Description |
|---|---|
| AGENT STATUS: | |
| AgentRegister | Agent registered with the call center |
| AgentUnregister | Agent unregistered with the call center |
| AgentGroupStatus | Notify the agent application 394 of agent group status changes for all groups that the agent is logged into |
| AGENT STATE CHANGES: | |
| AgentLogin | Agent logged in to a specific agent group |
| AgentLogout | Agent logged out of a specific agent group |
| AgentAvailable | Agent state is Available |
| AgentUnavailable | Agent state is Unavailable |
| AgentWrapUp | Agent state is Wrap Up |
| AGENT CALL CONTROL: | |
| ConnectionCleared | Connection cleared |
| DialAgentComplete | Dial agent request complete |
| Incoming | Incoming call |
| IncomingComplete | Incoming call established |
| Holding | Another agent is placing the call on hold |
| HoldingComplete | Another agent has placed the call on hold |
| HoldComplete | Hold request complete |
| Retrieving | Another agent is retrieving the call |
| RetrievingComplete | Another agent has retrieved the call |
| RetrieveComplete | Retrieve request complete |
| Transferring | Incoming transfer call |
| TransferringComplete | Incoming transfer call established |
| TransferComplete | Transfer request complete |
| ToggleComplete | Toggle request complete |
| Conferencing | Incoming conference call |
| ConferencingComplete | Incoming conference call established |
| ConferenceComplete | Conference request complete |
| TransferToCall-TypeComplete | Transfer to call type request complete |
| DialCustomer-Complete | Dial to customer request complete |
| CallWaiting | Call waiting notification |
| CallWaiting-Complete | Call waiting is complete |
| ConferenceMute | Conference Muted/UnMuted |
| CTI SUBSYSTEM 58 EVENTS: | |
| Agent State | Agent state change event. Event types: Agent Logged On, Agent Logged Off, Agent Not Ready, Agent Ready, Agent Working After Call |

TABLE 5-continued

Agent Manager Events

| Events | Description |
| --- | --- |
| Query Device Return | This event is in response to a query device request and returns a list of agent states: Agent Null, Agent Not Ready, Agent Ready, Agent Working After Call |
| Set Feature Return | This event is in response to the set feature request and returns the request status. When the feature is set, the appropriate event is also generated in addition to this event (such as Agent State). |

In general, the Agent Manager 384 provides call routing and agent and agent group management. Agents, either directly or through the CTI Service Manager (described in FIG. 16), request login/logout, availability state changes, status information, and call control for calls associated with each agent. The Agent Manager 384 handles these requests, performs validation, and assures that valid requests are processed. The Agent Manager 384 reports events associated with agent state and call control processing to the appropriate logged in agents and to the CTI Service Manager.

Call Routing

The Agent Manager 384 performs the routing functionality of the ACD subsystem 54. Generally, call routing is based on the call context of the call, predetermined rules, and environmental conditions of the ACD system 10. Call routing can be represented as a dynamically programmable function that uses the following equation:

Rules+Environment+Call Context=Actions

In general, the call routing function receives the Call Context from an incoming call and applies the call context with environmental information to the programmable rules to determine a set of actions to perform.

As described above, the call context includes a call type that can specify any value, including a group, that guides the call routing function to determine an Agent Group into which the incoming call is queued. In another embodiment, the Call Context can include a destination Agent Group Name and the URL of the originating caller 14 (for Web initiated calls).

The three levels of routing tables 389 provide the predetermined rules and the Call Context Mapper 386 implements the rules as described above.

Environmental conditions of the ACD system 10 also affect routing decisions. The Time of Day Routing Tables can be used to schedule when the call center is open and closed. The status of queues and performance of agents can also affect the routing decision. These conditions can be checked using the "If" action of the ACD Routing Table. If the environmental condition described by the parameter is true, then the routing passes to another step in the ACD Routing Table to perform a specific action. Such conditional application of actions produces real-time routing decisions based upon ACD system 10 conditions. System conditions can include Queue Depth per queue, Average Wait Time per queue, Agent Availability per queue, etc.

In general, the Agent Manager 384 supplies the Call Context data to the Call Context Mapper 386, which produces actions based on the Call Context data and returns the actions to the Agent Manager 384. The Agent Manager 384 then applies environmental information to the actions to determine if the action can take place. If environmental conditions are not correct, the routing action fails. If the conditions are acceptable, the action is taken.

Routing Operation

In more detail, for an incoming call the Agent Manager 384 receives the Call Context data from the Call Manager 60. The Agent Manager 384 determines if the call center is Open (as indicated by an event from the Administration Server 390). If closed, the Agent Manager 384 notifies the caller through the configured messaging and disconnects the call. Otherwise, the Agent Manager 384 requests that the Call Context Mapper 386 map the Call Context data to the appropriate actions. The Agent Manager 384 implements the Call Context Mapper 386 Action interface 387 to determine the actions.

When Call Context Mapper 386 determines an action to be performed, the Call Context Mapper 386 calls the appropriate Agent Manager interface method. While actions typically pass through the Agent Manager 384 for processing by other software components, the Agent Manager 384 processes the Route to Device (group or agent) action to evaluate the environmental conditions that exist at a device to determine if the routing action can take place. For example, for agent devices the agent must be logged in, have the correct availability state, and not be in a call. For agent groups, the group queue must not be full. If these conditions exist, the Agent Manager 384 returns a failure indication, which the Call Context Mapper 386 can test to produce other actions such as playing a failure message to the caller.

For an outgoing call (e.g., a PSTN callback), the Agent Manager 384 receives the Call Context data from the Customer Server 388. Just as above, the Call Context Mapper 386 finds the appropriate route. When the route is determined, the Agent Manager 384 requests that the Call Manager 60 place a call to the agent system 18 and to the caller through the PSTN gateway 36. The Call Context data are passed to Call Manager 60 when the call is made.

The Agent Manager 384 can receive a request to route the incoming call to a device (e.g., an agent or an agent group). The Agent Manager 384 queues the call to the group and returns to the Call Context Mapper 386.

The Agent Manager 384 can receive a request to return environmental conditions to the Call Context Mapper 386. For example, the Call Context Mapper 386 can request to determine if the call center is opened. The Agent Manager 384 tests this condition with the Data Manager 391 and returns the status. The Call Context Mapper 386 can present other types of conditional tests to the Agent Manager 384.

CTI Routing

The Agent Manager 384 may be asked to request a route of the CTI Service Manager of the CTI subsystem 58. The Agent Manager 384 pauses the Call Context Mapper 386 until either a CTI route is selected or a timeout expires. The Agent Manager 384 issues the request to CTI Service Manager and then sets the timer. If the timer expires before the selected route is received from CTI Service Manager 418, the Agent Manager 384 generates a Route End event telling the CTI subsystem 58 that the route is no longer requested. The Agent Manager 384 then continues the Call Context Mapper 386 processing.

If a selected route is received, the Agent Manager 384 attempts to establish the connection to the selected device. If successful, the Agent Manager 384 stops the Call Context Mapper 386. If the Route Select requested a Route Used indication, the Agent Manager 384 makes a Route Used request to the CTI Service Manager. Upon successful routing, the Agent Manager 384 issues a Route End to the CTI Service Manager. If the selected route fails, the Agent Manager 384 requests a Reroute from the CTI server 40 and resets the timer.

The CTI server 40 can send a Route End request to the Agent Manager 384 causing the Agent Manager 384 to terminate the timer before receiving a route from the CTI subsystem 58. Upon receiving this request, the Agent Manager 384 terminates the timer and performs the ACD routing.

Agent State Control

The Agent Manager 384 tracks agents as each agent logs in and logs out and submits requests. The Agent Manager 384 stores information such as the device ID, Name, password, transport address, availability, and call state, and user profile associated with that agent. The Agent Manager 384 also tracks information about calls associated with each agent. Each call has Call Context data, an id, and connection attributes for each connection in the call. The Agent Manager 384 also tracks the type of call (e.g., customer, internal, or external) and which agent is responsible for each call.

Agents and the CTI Service Manager can log into an Agent Group. When the Agent Application 396 attaches to the Agent Manager 384, the Agent Manager 384 performs authentication of agent name and password using, for example, the NT/COM Security model. When an agent logs into or out of an agent group, the Agent Manager 384 issues an event to the logged in agent (if there is a direct connection) and to the CTI Service Manager. If the agent login fails, the agent is notified and is not considered part of the group. The Agent Manager 384 also tracks the time an agent is logged into an agent group.

Agents and the CTI Service Manager can request changes to an availability state of an agent. An agent can be in one of four states: Not Logged In, Unavailable, Available, and Wrap Up. An agent in the Not Logged In state is unavailable to take calls from callers because that agent is not logged into an agent group. In the Unavailable state, an agent is logged into an agent group, but not available to take calls. In the Available state, an agent can take calls for each agent group in which that agent is logged in. In the Wrap-up state, the agent is unable to take additional calls because the agent is wrapping up after completing a conference with a previous caller. Upon completing a call with a caller, the state of the agent can enter the Wrap Up state by default if the agent selects that feature.

The Agent Manager 384 performs validation of the request and, if valid, changes the state of the agent. An event is generated to the agent (if there is a direct connection) and to the CTI Service Manager indicating the state change.

The Agent Manager 384 also tracks the call state of an agent. An agent is considered "Idle" if no calls are associated with the agent. If there are calls associated with the agent, the agent is considered "In Call." An agent is deemed to be "In Call" from the moment the Agent Manager 384 determines to route a call to that agent until the moment the Agent Manager 384 receives a Connection Cleared indication for that agent. While the agent is "In Call," the Agent Manager 384 refrains from routing other calls to that agent.

Call state changes do not generate events. However, the Agent Manager 384 tracks which agent is responsible for an incoming call from a caller 14. When the connection of an agent is cleared, the Agent Manager 384 sets the state of the agent to "Wrap Up" if it was the responsible agent and "Wrap Up" was selected.

Agent Call Control

As described above, the Call Control 68 requests pass to the Call Manager 60 of the switch 50 for processing. The Agent Manager 384 waits for events from the Call Manager 60 to tell the requesting agent of the success or failure of the request. In one embodiment, the switch 50, and not the Agent Manager 384, reports call control events to the CTI Subsystem 58.

The Agent Manager 384 receives events from the Call Manager 60 for incoming calls. The Agent Manager 384 sends the Media on Hold selection to Call Manager 60 for each incoming call.

In one embodiment, the Agent Manager 384 ensures that each agent does not have more than two calls associated with it. The Agent Manager 384 enforces this limit when allocating calls from callers and when requested to dial out to callers or other agents.

Agent Status

The Agent Manager 384 notifies the Agent Application 394 of agent group queue status changes. The Agent Application 394 can request the queue status from the Agent Manager 384 periodically (e.g., every four seconds). The Agent Manager 384 can also automatically forward agent group status information to the Agent Application 394 when the agent group queue size changes. The Agent Manager 384 is also responsible for reporting agent (device) status to the CTI Service Manager when requested.

Customer Server

The Customer Server component 388 provides an external interface 400 that allows Web Browser-based callers to initiate an incoming or outgoing call to or from the ACD 56. The CGI Program 392 (or any other program written to use the Customer Server interface 400) passes the Call Context to the Customer Server 388. For incoming calls, the Customer Server 388 returns the IP Address that the caller system 14 should call. The Customer Server 388 obtains this IP Address from the Data Manager 391. In one embodiment, the IP address of the server 30 is used nstead of the IP address of the agent system 18, and in this way the IP address of the agent is shielded from callers on the other side of the network 22.

Table 6 shows an exemplary list of requests handled by the Customer Server interface 400:

TABLE 6

Customer Server Requests

| Requests | Description |
| --- | --- |
| InComingCallRequest | Requests a call into the ACD. The Call Context Data is passed in. The Customer Server 388 returns a message ID to uniquely identify any subsequent requests and the IP Address of the server to call. |
| OutgoingCallRequest | A request for the ACD 30 to call the customer. The message ID is returned. |
| GetCallStatus | Get the call status for the call indicated by the message ID. If the id is invalid, and error is returned. Otherwise, the status is returned (see parameters) |
| CancelCall | Request for the call to be cancelled. |
| DisplayMessageText | Display message text |
| DisplayURL | Display URL |
| CallConnected | Call is connected, terminate processing for this call |
| CallQueued | Call is queued, so start giving out queue position |

Administration Server

FIG. 15 shows the Administration Server component 390 in communication with the CP and CTI subsystems 50, 58, the Administration Application 396, and the Data Manger 391. The Administration Server 390 provides an external server interface for administrating the server 30. The Administrator Application 396 uses this external server interface to set and get ACD configuration. The Administration Server 390 uses the CP Subsystem 50 and CTI Subsystem 58 interfaces to set and get the subsystem information. For example, the Administration Server 390 issues requests to the Call Manager 60 of the CP subsystem 50 to set gateway and gatekeeper configurations, and requests to the CTI Service Manager of FIG. 16 to set and get CTI specific configuration. The Administration Server 390 also communicates with the Data Manager 391 to set and get ACD specific configuration information.

The Administration Server 390 also provides security to the system by preventing unauthorized individuals to view or configure the system. The Administration Server 390 ensures that only one call center administrator is logged on at a time. The administrator may not configure the system without first starting the system. The Administration Server 390 can be launched only by the call center Service Account or by members of the call center Administrators NT Group. This prevents unauthorized external applications from launching the component 390.

The Administration Server 390 notifies other components when the call center is considered open or closed. The call center can be opened or closed through the call center Schedule and by manual operation through the Administration Application 396. When conditions occur that close the call center, the Administration Server 390 sends the event to any interested components. When conditions occur that open the call center, the Administration Server 390 issues the corresponding event. To determine if the call center is open or closed, the Administration Server 390 tracks the call center Schedule and monitors the Administration Interface for manual commands.

The Administration Server 390 receives license key configuration from the Administration Application 396. When new license information is input and is valid, the Administration Server 390 stores the information in the Data Manager 391.

Data Manager

The Data Manager 391 component stores the ACD Subsystem configuration and historical information to persistent storage. The configuration information includes Agents, Agent Groups, ACD Routing Tables, and other ACD configuration.

ACD Subsystem Client Applications

The Administration Application 396 configures the ACD subsystem 54 and provides the following functionality. The Administration Application 396:

(1) logs into the call center;

(2) configures agent systems 18;

(3) configures agent groups including text messages, URLs, and media streams;

(4) configures system text messages and URLs;

(5) sets the call center schedule;

(6) specifies the IP address of the server system 30 to be used by external callers 14

(7) opens and closes the call center;

(8) configures the CTI server 40; and (9) configures the gateway 36 and gatekeeper.

Caller Helper Application

Generally, the Caller Helper Application 398 is in communication with the Internet telephone on the caller system 14 to start the telephone, register for notification of telephone events and state changes, dial out from the caller system 14 to the system server 30, and to hang-up the caller. In particular, the Caller Helper Application 398 controls the Internet telephone installed on the caller system 14 and communicates with the ACD 56 through the CGI program 392. The Caller Helper Application 398 starts the Internet telephone on the caller system 14, verifies that the version of the Internet telephone installed on the caller system 14, and signals the CGI program 392 to initiate the H.323 call between the caller and one of the agent systems 18.

The Caller Helper Application 398 is in communication with the CGI program 392 to reserve an agent, request call queue status and call center information while waiting in the queue, and to cancel the queued call. The Caller Helper Application 398 accomplishes this functionality by issuing the "Reserve URL," the "Qstatus URL", and the "Qcancel URL" requests to the CGI program 392 through the CGI Program Interface 393 described below.

In particular, the Caller Helper Application 398 issues the "reserve" URL to reserve an agent for a particular call type (agent group). Call context data is sent along with the reserve request. The CGI program 392 returns the IP address of the server system 30. In another embodiment a different server system can route the Internet telephone call, and the CGI program 392 returns the IP address of that server system.

The Caller Helper Application 398 sends "Qstatus URL" requests to the CGI program 392 to display call queue status, text messages, and web pages to the caller while waiting in the call center queue for an available agent. The "Qstatus URL" is also used to determine when the conference is successfully established with one of the agent systems. At this point, the Caller Helper application 398 exits.

The caller can cancel the call at any time. In such event, the Caller Helper Application 398 detects the cancel, notifies the CGI program 392 using the "Qcancel URL" request, hangs up the caller if the call was connected, and exits the Caller Helper Application 398.

CGI Program

The CGI program 392 provides an interface 393 between the web browser of the caller system 14, the Caller Helper Application 398, and the Customer Server 388 to initiate H.323 Internet calls between the caller and one of the agent systems 18. Examples of requests provided by the interface 393 are shown in Table 7 below:

TABLE 7

| CGI Program Requests | |
|---|---|
| Requests | Description |
| InitCall URL | Initializes the CGI and Caller Helper Application Programs. |
| Reserve URL | Requests processing of an Incoming Call from the caller 14. |
| Qstatus URL | Obtains the call status for the call indicated by a message ID. |
| Qcancel URL | Request that the call indicated by the message ID be cancelled. |
| CallBack URL | Requests that an agent call back the caller later. |

The caller can start the call by placing an Internet call to the ACD 56 or by selecting a PSTN Callback. The CGI program 392 processes each URL by making requests to the ACD Customer Server 388 through the Customer Server interface 400 and returning responses to the web browser and the Caller Helper Application 398.

In more detail, the web browser issues the "InitCall URL" request to CGI program 392, the Caller Helper application 398 issues the "Reserve URL", "Qstatus URL", and "Qcancel URL" requests, and the web browser/PSTN Callback application issues the "callback" URL" request. In general, the responses to these requests lead to initializing the Caller Helper Application 398, establishing the call between the caller and the H.323 switch 50, displaying message text and/or a URL to the caller, and displaying queue position to the caller.

Specifically, the "InitCall URL" request causes initialization of the Caller Helper Application 398. When the caller presses the "Connect Me" button on the web page, the web browser sends the "InitCall URL" to the CGI program 392. The CGI program 392 returns a file that automatically starts up the Caller Helper Application 398. The Caller Helper Application 398 sends the "Reserve URL" to the CGI program 392 to request that a call be established with the ACD 56. The CGI program 392 determines the IP address of the caller, issues an Incoming Call request to the Customer Server 388, and returns the response to the Caller Helper Application 398.

Agent Application

The Agent Application 394 is in communication with the Agent Manager 384 and the Internet telephone installed on the caller system 14. The Agent Application 394 makes requests to and processes events from the Agent Manager 384 as described above. The Agent Application 394 communicates with the caller to start the Agent Application 394 and register for notification of telephone events and state changes.

The Agent Application 394 provides the functionality necessary for an agent to process customer, internal, and external ACD calls through an H.323 compliant Internet telephone. The Agent Application 394 provides the following functionality:

Registers with the call center;

logs in and out of agent groups for customer call support;

request agent availability state changes;

request agent call control accept and process call control notifications from the ACD 56;

accept agent group status from the ACD 56;

track agent status;

report External calls to the ACD 56;

provide a Call Context Data Link to third party applications.

Once registered with the call center, the Agent Application 394 enables the agent to log in and out of agent groups in which that agent is a member. If not logged into any agent groups, the agent can process internal and external calls, but not take calls from caller systems 14. To be considered available to process calls from a caller, the agent logs into an agent group.

The Agent Manager 384 controls the agent availability state. The Agent Application 394 requests agent state changes (Available/Unavailable) and requests Wrap Up configuration from the Agent Manager 384. The Agent Manager 384 directs the Agent Application 394 to the Wrap Up state at the end of calls.

The call control functions supported by the Agent application are accept call from caller or agent or supervisor;

dial out to agent or supervisor;

dial out to caller;

accept and reject call waiting indications;

place a call on hold;

retrieve a call;

transfer to an agent or supervisor;

transfer a call to an agent group queue;

conference in third party; and toggle between call on hold and active call; and mute of the audio of an agent in a three-party conference.

The Agent Application 394 tracks agent status and receives the Agent Group Status from Agent Manager 384 whenever the agent group queue changes.

ACD Operation

At server system 30 start up, an initialization sequence starts the Agent Manager 384. The Agent Manager 384 then starts those software components that it uses (e.g., the Call Context Mapper 386, Call Manager 60, Device Manager 82, Data Manager 391, CTI Service Manager 418). The Agent Manager 384 registers all Group Devices with the Device Manager 82 of the Switch 50 so that the devices are known to the Call Manager 60 for queuing. Agent Devices register with the Agent Manager 384. CTI-Based Agents register with the Device Manager 82 by logging into an Agent Group. When the initialization finishes, the Agent Manager 384 sends a Start request to the Call Manager 60 to allow acceptance of incoming calls.

Also, the Call Context Mapper 386 obtains the routing tables 389 from the Data Manager component 391. The Administration Server 390 configures these tables by configuring Agent Group, call center Schedule, and System Level Messaging. The Call Context Mapper 386 obtains the table information from the Data Manager 391. The tables 389 require real-time updating for any changes to the call center schedule or agent group information. Changes to the tables 389 do not take effect while a call is traversing that table. Such changes take effect for the next call.

The caller 14 can use a Web Browser to contact the ACD 56. The Web Browser connects to the Web Server 32. The Web Server 32 starts the CGI program 392 running. The CGI program 392 delivers Call Context data to the Call Manager 60 of the ACD server 30 in advance of the incoming H.323 call. The Customer Server 388 then returns the IP Address of the ACD H.323 Switch to the CPI program 392. The Caller Helper Application 398 uses this IP address to place an H.323 Internet call to the ACD server 30. The switch 50 delivers the call to the Agent Manager 384 for call routing.

The Agent Manager 384 detects when a new incoming call arrives at the ACD server 30, determines the actions to perform for the caller, such as play media messages or route the call to an agent group. The Agent Manager 384 implements the actions through the Call Context Mapper 386, supplying the Call Context data to the Call Context Mapper 386 for performing the mapping. The Call Context Mapper 386 applies rules defined in the programmable routing tables 389 to determine the actions.

The Call Context Mapper 386 parses the Call Context data looking for relevant information that determines the actions. From the call type, the Call Context Mapper 386 determines the appropriate actions. The Call Context Mapper 386 can be dynamically programmed to map this call type to tables describing the types of routing actions that occur for calls of this call type. Typically, the mapping leads to an agent group, or groups, into which the incoming call is placed.

The Administration Server component 390 monitors the call center Schedule and indicates to the Agent Manager 384 when the call center is closed. If closed, the Agent Manager 384 does not call the Call Context Mapper 386 to perform action processing. In another embodiment, the Time of Day Routing Tables are programmable so that each call type can be programmed for different times of the day. For this embodiment, the Administration Server 390 does not monitor the call center Schedule.

The Call Context Mapping Table uses the call type in the Call Context data to find a unique Time of Day Routing Table for that call type. The Time of Day Routing Table is then used to find the correct ACD Routing Table for the current time of day. This allows the use of different rules based on the time of day when different resources are available in the call center.

The call type and time of day get the call to the list of actions appropriate for this call. When an ACD Routing Table is found, the actions are executed, sequentially, until either an agent is connected or the traversal of the ACD Routing Table ends. The Agent Manager 384 executes the ACD Routing Table actions by calling functions provided by the Call Context Mapper interface 387.

If the Agent Manager 384 routes the incoming call to the agent system 18, the Agent Manager 384 notifies the Customer Server 388 of the connection when the caller system 14 is connected to the agent system 18. The Customer Server 388 stops tracking the call after a connection is established to the agent system 18. If the Call Manager 60 rejects the attempt to save the Call Context, (e.g., because the system call limit has been reached), then the Customer Server 388 sends the "System Limit Reached Text" and URL as configured by the administrator and the call is no longer tracked. The Customer Server 388 obtains the "System Limit Reached Text" and URL from the Data Manager 391.

CTI Subsystem

The ACD 56 can operate as a standalone call center or together with the conventional PSTN-based call center 41 described in FIG. 1. Conventional PSTN call centers typically include one or more switches that are controlled and monitored by a computer or network of computers. Such computers control the functionality of these switches and monitor events that occur at these switches. The CTI subsystem 58 integrates the ACD 56 with a PSTN computing environment (e.g., the PSTN call center 41) so that these computers can control the functionality and monitor events of the ACD 56. The CTI subsystem 58 provides a set of software components that can be used by the CTI server 40 to access the ACD 56 for call control and event monitoring. In general, the set of software components of the CTI subsystem 56 maps CTI server specific messaging to ACD 56 messaging.

Figure 16:
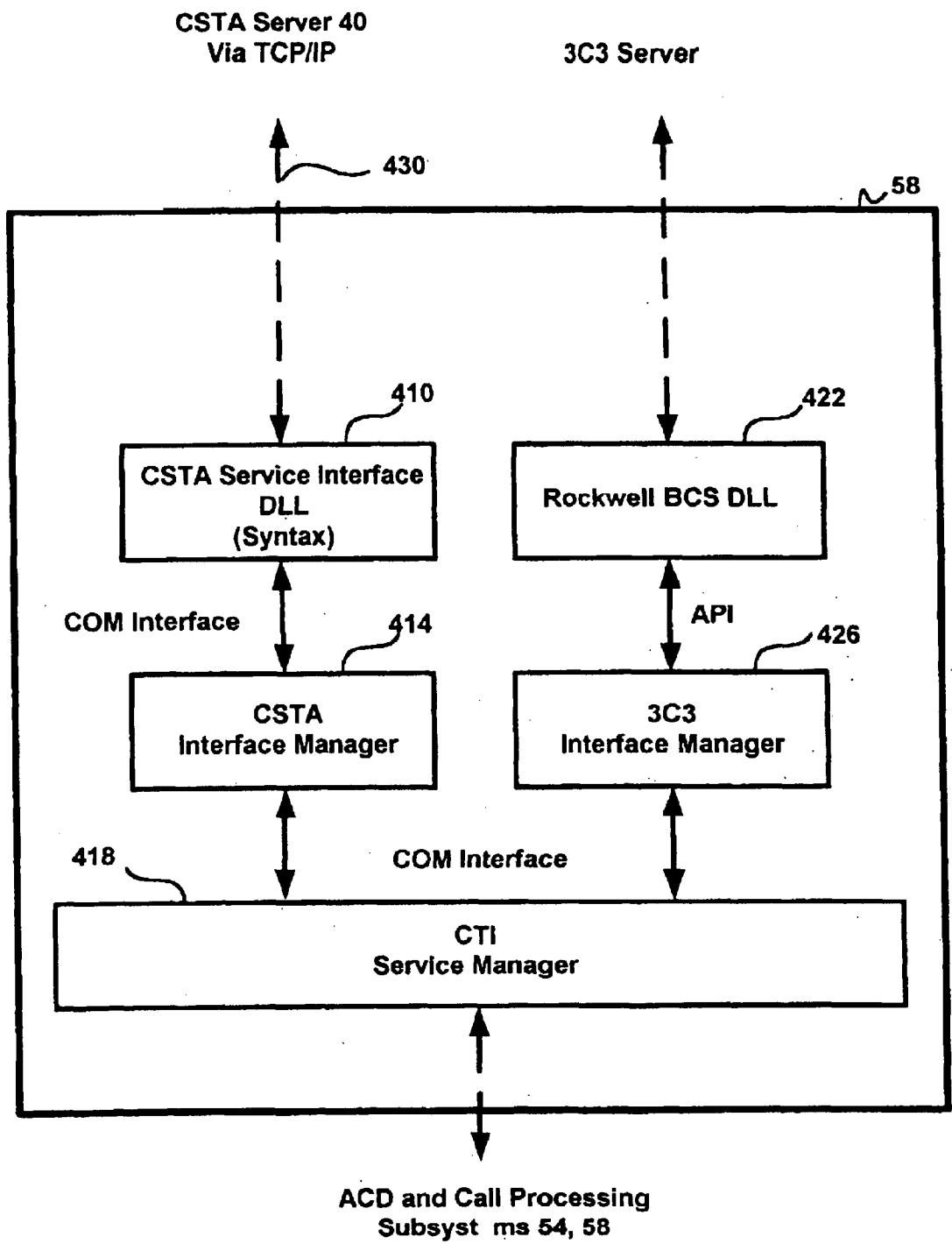
FIG. 16 is a block diagram of the software components for the CTI subsystem component of the software installed on the server system.

In one embodiment, the CTI subsystem 58 implements the CSTA protocol to communicate with the CTI server 40. FIG. 16 shows the CTI subsystem 58 in communication with the external CTI server 40 using the CSTA protocol over a TCP link 430. The CTI subsystem 58 includes a CSTA (Computer Supported Telecommunication Application) Services Interface 410, a CSTA Interface Manager 414, and a CTI Service Manager 418. CSTA is a server-based first- and third-party switch control interface defining a set of messages and protocols for driving a switching engine. The CSTA protocol employs PDUs (Protocol Data Units) to exchange information over the network 22 for requesting services and reporting events.

The CTI subsystem 58 communicates with the ACD and CP subsystems 54, 50 using the interfaces. The CSTA Services Interface 410 and CSTA Interface Manager 414 components are specific to the CSTA protocol used between the CTI server 40 and ACD server 30. The CTI Service Manager 418 hides the details of the ACD and CP subsystems 54, 50 from the specifics of the underlying CTI protocol.

As shown, the CTI subsystem 58 can concurrently support other CTI servers that communicate with a protocol other than the CSTA by including components that support that other protocol. For example, to support a 3CS CTI server, the CTI subsystem 58 can also include a 3CS Service Interface 422 (e.g., a Rockwell 3CCS DLL) and a 3CS Interface Manager 426. Further, the CTI Service Manager 418 is updated to handle both 3CS and CSTA. The interface between the CTI subsystem 58 and the ACD and CP subsystems 54, 50 can remain unchanged.

CTI subsystem 58 handles service requests from the CTI server 40. Upon receiving a CSTA service request from the external CTI server 40, the CTI subsystem 58 makes an appropriate request to the ACD or CP subsystem 54, 50 to perform the requested service if needed, and return the result to the requesting CTI server 40.

The CTI subsystem 58 handles event reports from the ACD or CP subsystems 54, 50. Upon receiving a call or an agent state event report from the ACD or CP subsystem 54, 50, the CTI subsystem 58 composes an appropriate CSTA event report for each monitored device involved in the event, and sends these CSTA event reports to the monitoring CTI server 40. Event reports from the ACD 54 or CP subsystem 58 include those caused by a service request from the CTI server 40 in addition to those caused by other means such as an incoming call.

The CTI subsystem 58 handles routing service requests from the ACD subsystem 54. Upon receiving a routing CSTA service request from the ACD subsystem 54, the CTI subsystem 58 issues an appropriate request to the CTI server 40 and returns an error result, if any, to the ACD subsystem 54.

CSTA Services Interface

In one embodiment, the CSTA Services Interface 410 is a DLL COM component that implements the CSTA protocol stack (CSTA, ROSE and TPKT TCP) including ASN.1 (Abstract Syntax Notation 1) encoding and decoding of the PDUs. The ASN.1 is described in the CCT Rec X.208 (ISO/IEC 8824:1990), incorporated by reference herein. The ROSE standard (Remote Operation Service Elements) is described in CCT X.219 and CCT Rec X.229 (ISO/IEC 9072-1:1989 and ISO/IEC 9072-2:1989, respectively), both of which are incorporated by reference herein. In the ROSE standard, every message transmitted is one of four types: Invoke(ROIV), Result(RORS), Error (ROER), or Reject (RORJ). ROIV is a request or unsolicited message, RORS is a positive response to a request, ROER is a negative result to a request, and in response to a request, RORJ indicates an encoding problem. Each ROIV includes an invoke ID.

Through the CSTA protocol stack, the CSTA Services Interface 410 communicates with the external CTI server 40. The CSTA Services Interface 410 provides the CSTA Interface Manager 414 with the CTI link control, CSTA routing services request, asynchronous Result/Error return for the requested CSTA service, and event reports via COM interfaces. The CSTA Services Interface 410 declares COM event sinks for the CSTA Interface Manager 414 and sends events related to CTI link control, CSTA services request, or Error received from the CTI server 40. In more details, the CSTA Services Interface 410:

1. listens on the TCP port for CTI link connection request from the external CTI server 40, if so directed by CSTA Interface Manager 414;
2. reports a CTI link connection request to the CSTA Interface Manager 414;
3. accept or reject the CTI link as directed by CSTA Interface Manager 414;
4. report to CSTA Interface Manager 414 if the CTI link is shut down by the external CTI server 40;
5. close down the CTI link if directed by CSTA Interface Manager 414;

6. stop listening on the TCP port if directed by CSTA Interface Manager 414;
7. read an incoming message on the CTI link;
8. Remove the TPKT header from a read message and ASN.1 decode it. The decoded result is a ROSE PDU and can be a ROIV (request), a RORJ (reject), a ROER (error), or a RORS (positive result). If there is a syntax error at the ROSE layer, return RORJ to the CTI server 40.
9. If the received PDU is a ROER or RORS and there is no outstanding ROIV with the same invoke ID, and then return RORJ to the CTI server 40. Otherwise, return Result (Success in case of RORS or Error Return in case of ROER) event to CSTA Interface Manager 414.
10. If the received PDU is RORJ, an error has occurred at the ROSE layer in the previously sent ROSE PDU. If the previously sent PDU was ROIV, return Result (error) to the CSTA Interface Manager 414.
11. If the received PDU is ROIV and there is a CSTA syntax error, send back RORJ to the CTI server 40. Otherwise, keep the record of the invoke ID, and make an appropriate service request event to the CSTA Interface Manager 414. After working on the requested event, the CSTA Interface Manager 414 sends the positive Result or Error return with the same invoke ID to CSTA Services Interface 410 as an asynchronous request.
12. Receives a request from CSTA Interface Manager 414. The request can be a CTI link management, asynchronous Result/Error return, routing service request or a CSTA event report.
13. If the received request is for a CTI link management, perform appropriate actions as described in steps 1 to 6.
14. If the received request is the positive Result return, compose an appropriate RORS with the matching invoke ID and send it to the CTI server.
15. If the received request is the negative Error return, compose an appropriate ROER with the matching invoke ID and send it to the CTI server.
16. If the received request is a routing service request or a CSTA event report, assign a unique invoke ID, compose an appropriate ROIV, encode ROIV, attach a TPKT header and send it to the CTI server. The invoke ID is kept to match against RORJ.

ROER or RORS to be received from the CTI server later.

CSTA Interface Manager

The CSTA Interface Manager 414 is a DLL COM component operating as a user layer of the CSTA services implemented by CSTA Service Interface 418 component. The Interface Manager 414 provides the Service Manager 410 with the CTI link control, CSTA Routing services request, asynchronous Error return for the requested CSTA service, and Event reports through COM interfaces. The Interface Manager 414 also declares COM event sinks for Service Manager 418 and sends events related to CTI link control, CSTA services request or Error received from the CTI server 40.

Other than for monitoring services, the CSTA Interface Manager 414 operates as a pass through layer between Service Interface 410 and the CTI Service Manager 418. The Interface Manager 414 checks the CSTA semantics, such as mandatory fields, forwards events received from the CSTA Service Interface 410 to the CTI Service Manager 418, and forwards requests received from the CTI Service Manager 418 to the CSTA Service Interface 410.

When the CSTA Interface Manager 414 receives an event report from the CTI Service Manager 418, the CSTA Interface Manager 414 constructs an appropriate CSTA event report for each monitored device involved in the event, and sends each report to the CSTA Service Interface 410 as an appropriate request.

In more detail, the functions of the CSTA Interface Manager 414 are as follows. The CSTA Interface Manager 414:

1. Receives a service request event from the Service Interface 410 and checks the CSTA semantics of the service request event. If the Interface Manager 414 finds an error in the request, the Interface Manager 414 returns a negative response to the event;
2. If the service request event is "Monitor Start," the Interface Manager 414 adds a new entry to an appropriate Monitor maintenance tables, assigns a unique Monitor Cross Reference ID, and returns the Reference ID in a Monitor Start Return request to the CSTA Services Interface 410;
3. If the service request event is "Monitor Stop," the Interface Manager 414 removes the corresponding entry from the appropriate Monitor maintenance tables and sends a Result Return to the CSTA Services Interface 410 asynchronously.
4. For CTI link management requests received from CTI Service Manager 418, the CSTA Interface Manager 414 issues corresponding requests to the CSTA Services Interface 410 and returns a response after receiving a response from the CSTA Services Interface 410.
5. For event reports type requests received from CTI Service Manager 418, the CSTA Interface Manager 414 parses the event and identifies devices, corresponding monitors, and CTI links. CSTA Interface Manager 414 returns an appropriate response to Service Manager 418 and issues an appropriate event report for each of the monitors to the CSTA Services Interface 410. A positive response from CSTA Services Interface 410 is ignored. If the CSTA Services Interface 410 returns a negative response, then CSTA Interface Manager 414 performs appropriate exception handling.
6. For return result type requests received from CTI Service Manager 418, the CSTA Interface Manager 414 returns a response to Service Manager 418 after checking the syntax of the request. CSTA Interface Manager 414 then issues a corresponding request to the CSTA Services Interface 410. A positive response from CSTA Services Interface 410 is ignored. Upon a negative response, the CSTA Interface Manager 414 performs an appropriate exception handling.
7. For routing service requests received from CTI Service Manager 418, the CSTA Interface Manager 414 returns a response to the CTI Service Manager 418 after validating the syntax of the request. The CSTA Interface Manager 414 then issues a corresponding request to the CSTA Services Interface 410. A positive response from the CSTA Services Interface 410 is ignored. For a negative response, the CSTA Interface Manager 414 sends an Error Return message to the CTI Service Manager 418.

CTI Service Manager

In one embodiment, the CTI Service Manager 418 is an executable component operating as a user layer of the CSTA services implemented by the CSTA Service Interface 410 and the CSTA Interface Manager 414 components. The CTI Service Manager 418 is also in communication with the CP subsystem 50 through the Call Manager interface 62 and with the ACD subsystem 54 through the Agent Manager 384. Such interfaces are independent of the particular implementation of the underlying CTI protocol stack. Accordingly, such interfaces are the same whether the CTI subsystem 58 implements the CSTA Services Interface 410 or the Rockwell 3CS Service Interface 422.

The CTI Service Manager 418 maintains a configuration information table on the external CTI servers. Each entry in the table corresponds to a licensed and configured CTI server connected to the ACD 56. Each entry includes the following attributes:

CTI server type (CSTA, 3CS, etc.);

Routing application enabled/disabled (i.e., an indicator of whether that CTI server is allowed to perform the call routing);

Number of opened CTI links; and

IP Address of the CTI server, if necessary.

The Administration Server component 390 of the ACD subsystem 54 can add, delete, and modify the external CTI server entries by sending an appropriate request to CTI Service Manager 418. Examples of other requests from the Administration Server component 390 include obtaining a list of CTI servers and configuring a 3CS server.

The CTI Service Manager 418 controls access from external CSTA-based CTI servers and manage CTI links via TCP connection control requests provided by CSTA Services Interface 410 and CSTA Interface Manager 414. When a CTI link Requested event is received from CSTA Interface Manager 414, the CTI Service Manager 418 determines whether to accept or reject the request.

The CTI Service Manager 418 accepts the CTI link request if:

1. the IP address of the requester is in the configuration information table;
2. the total number of CTI links does not exceed a predetermined limit; and
3. If the requester has a routing application enabled, no other CTI link from another CTI server has the routing application enabled.

For action events received from CSTA Interface Manager 414 related to CSTA service requests, the CTI Service Manager 418 forwards the received event as a request to the Agent Manager 384 or Call Manager 60. The Agent Manager 384 or Call Manager assigns a unique request ID and returns the request ID as a return response parameter to CTI Service Manager 418. The CTI Service Manager 418 then maps the request ID to the corresponding "CTI link ID, invoke ID" pair specified in the received event from CSTA Interface Manager 414. This mapping relationship is stored by the CTI Service Manager 418 until the CTI Service Manager 418 receives an event from the Agent Manager 384 or Call Manager 60 indicating completion or failure of the requested service.

When the CTI Service Manager 418 receives a Route End or Error Return from the CSTA Interface Manager 414 (identified by the Route Cross Reference ID or the invoke ID), the Service Manager 418 issues the Route End event to the Agent Manager 384 with an appropriate error value. There is no positive Result return for the routing service request.

When the CTI Service Manager 418 receives a routing service request from the Agent Manager 384, the CTI Service Manager 418 references the CTI server configuration table. There is no CTI-based routing if there is no CTI server entry with the Routing enabled and with the number of opened CTI links greater than zero. Consequently, an error condition is returned to the Agent Manager 384.

If an entry is found, the CTI Service Manager 418 assigns a unique Route Cross Reference ID and returns the Route Cross Reference ID to the Agent Manager 384. Then the CTI Service Manager 418 sends a corresponding routing request to the CSTA Interface Manager 414 or 3CS Interface Manager 426, depending upon the CTI server type of the found entry. In more detail, the CTI Service Manager 418 operates as follows.

1. The CTI Service Manager 418 directs the CSTA Services Interface 410 through the CSTA Interface Manager 414 to listen on a TCP port for a CTI link connection request from the external CTI server 40.
2. When reported of a CTI link connection request from the CSTA Services Interface 410 through the CSTA Interface Manager 414, the CTI Service Manager 418 references the appropriate CTI server information table, and determines whether to accept or reject the connection request.
3. The CTI Service Manager 418 can close the CTI link by sending a request to CSTA Services Interface 410 through the CSTA Interface Manager 414.
4. When reported of a CTI link closing by the CTI server 40, the CTI Service Manager 418 updates the appropriate CTI server information table.
5. The CTI Service Manager 418 can send a request to the CSTA Services Interface 410 through the CSTA Interface Manager 414 to cease listening on the TCP port.
6. The CTI Service Manager 418 forwards a CSTA service request event, other than routing related requests, from the CSTA Interface Manager 414 to the Agent Manager 384 or Call Manager 60. The Agent Manager 384 or Call Manager 60 returns a unique request ID as a return parameter. The CTI Service Manager 418 forwards this request ID to the CSTA Interface Manager 414.
7. The CTI Service Manager 418 forwards routing related service requests (e.g., Route Select and Route End) and Error Return events received from CSTA Interface Manager 414 to the Agent Manager 384 as events. Both Error Return and Route End result in a Route End event but with different error values. The CTI Service Manager 418 uniquely identifies such service requests by the Route Cross Reference ID returned to the Agent Manager 384 in response to a Route Request service request.
8. The CTI Service Manager 418 receives events from the Agent Manager 384 and the Call Manager 60. If the event is a positive reply to the requested service, as identified by the matching request ID, then the CTI Service Manager 418 issues a positive Result Return to the CSTA Interface Manager 414.
9. If the received event is a negative reply to the requested service, then the CTI Service Manager 418 sends a negative Error Return to the CSTA Interface Manager 414.
10. Following the positive reply to the request, the CTI Service Manager 418 expects to receive various return results and event reports from the Agent Manager 384 or Call Manager 60. The CTI Service Manager 418 returns a response to the Agent Manager 384 or Call Manager 60 after a syntax check. Then the CTI Service Manager 418 sends a corresponding event report to the CSTA Interface Manager 414 and 3CS Interface Manager 426 if there is an opened CTI link for the corresponding CTI servers. A positive response from the CSTA Interface Manager 414 and 3CS Interface Manager 426 is ignored. If a negative response is received, then the CTI Service Manager 418 performs an appropriate exception handling.

11. The CTI Service Manager 418 can receive a routing service request from the Agent Manager 384. The CTI Service Manager 418 checks the CTI server information table. If there is no CTI server entry with the Routing enabled and with the number of opened CTI links greater than zero, there is no CTI-based routing. The CTI Service Manager 418 returns an error condition to the Agent Manager 384 in response to the request.

12. If an entry is found and the requested service is Route Request, the CTI Service Manager 418 assigns a unique Route Cross Reference ID and returns the Route Cross Reference ID to the Agent Manager 384 as a return response parameter. Then the CTI Service Manager 418 issues a corresponding routing request to the CSTA Interface Manager 414 or 3CS Interface Manager 426, depending upon the CTI server type in the entry.

13. If the CSTA Interface Manager 414 receives negative return response from CSTA Services Interface 410, the CSTA Interface Manager 414 sends an Error Return message to the CSTA Interface Manager 414. The CSTA Interface Manager 414 then issues a Route End message to the Agent Manager 384 with an appropriate error value.

The following tables 8–11 provide details of the interfaces between the CSTA Services Interface 410, CSTA Interface Manager 414, CTI Service Manager 418, and Agent Manager 384. Table 8 shows an exemplary list of events issued from the CSTA Service Interface (SI) 410 to the CSTA Interface Manager (IM) 414 and from the CSTA Interface Manager (IM) 414 to the CTI Service Manager (SM) 418.

TABLE 8

CSTA SI Events (to IM) and CSTA IM Events (to SM)

| EVENT | DESCRIPTION |
|---|---|
| CTI Link Requested | The CSTA SI sends this event when a TCP connection request is detected on the listen socket. A reply to this event comes as a Reply to a CTI Link Request. |
| CTI Link Closed | The CSTA SI sends this event when it detects that the CTI link is closed by the far-end, i.e., the CTI server. |
| Monitor Start | Device can be any physical or logical device including monitor group devices. |
| (A CSTA SI only event) | The (CTI link ID, Invoke ID) is used to match the asynchronous reply |
| Monitor Stop (A SI only event) | (CTI link ID, Invoke ID) is used to match the asynchronous reply |
| Route Select | Route cross-reference ID references the one CTI SM sent in a Route Request. The event specifies the device id of the device to which the call is to be routed. The device can be an Agent or Agent group. There is no positive reply to this request. After the call is rerouted as specified, the Agent Manager 384 sends a Route End request, otherwise the Agent Manager 384 can send Re-Reroute request. If route used required is TRUE, Service Manager sends Route Used |

TABLE 8-continued

CSTA SI Events (to IM) and CSTA IM Events (to SM)

| EVENT | DESCRIPTION |
|---|---|
| Route End | This event indicates that the CTI server is not involved in the routing of the call identified by the Route Cross Reference ID. There is no positive reply to this request. If there is an error, the SM send Error Return. The CTI server may use error field in this message instead of ROER. |
| Error Return | This is a negative asynchronous reply to routing related requests. This results from the SI receiving ROER or RORJ from the CTI server in reply to the routing related requests. This event is also sent by IM to SM when IM receives negative response from SI. |
| Alternate Call | (CTI link ID, Invoke ID) is used to match the asynchronous reply. If a reply indicates success, the CSTA SI receives Held and Retrieved requests later |
| Clear Connection | (CTI link ID, Invoke ID) is used to match the asynchronous reply. If a reply indicates success, the CSTA SI receives Connection Cleared and possibly Call Cleared events. |
| Conference Call | (CTI link ID, Invoke ID) is used to match the asynchronous reply. If the reply indicates success, the CSTA SI receives a series of events, last of which is a Conferenced event. |
| Divert Call | (CTI link ID, Invoke ID) is used to match the asynchronous reply from IM. If the reply indicates success, the CSTA SI receives a series of events, last of which is a Diverted event. Device can be either Agent or ACD group |
| Hold Call | (CTI link ID, Invoke ID) is used to match the asynchronous reply from IM. If a received reply indicates success, CSTA SI receives a Hold events |
| Make Predictive Call | (CTI link ID, Invoke ID) is used to match the asynchronous reply from IM. If a received reply indicates success, the CSTA SI receives a Service Initiated, Originated, Delivered, and Established events, or in case of a failure, Failed and Connection Cleared events |
| Query Device (Agent State) | (CTI link ID, Invoke ID) is used to match the asynchronous reply from IM. Device can be Agent only |
| Retrieve Call | (CTI link ID, Invoke ID) is used to match the asynchronous reply from IM. If a received reply indicates success, CSTA SI receives Retrieved events |
| Snapshot Device | (CTI link ID, Invoke ID) is used to match the asynchronous reply from IM. Device can be either Agent or ACD group |
| Set Feature (Agent State) | (CTI link ID, Invoke ID) is used to match the asynchronous reply from IM The Device can be an Agent only. Agent parameter can be:<br><br>Agent Logged On,<br>Agent Logged Off;<br>Agent Not Ready,<br>Agent Working After Call<br>Agent login ID, password and device ID of ACD group are mandatory for Agent Logged On<br>If a received reply indicates success, CSTA SI receives Agent State events |
| Transfer Call | (CTI link ID, Invoke ID) is used to match the asynchronous reply from IM. The CSTA SI expects to receive a series of events, last of which is a Transferred event. |

Table 9 shows an exemplary list of requests received by the CSTA Interface Manager 414 from the CTI Services Manager 418 and by the CSTA Services Interface 410 from the CSTA Interface Manager 414.

TABLE 9

CSTA IM Requests (from SM) and
CSTA SI Requests (from IM)

| REQUESTS | DESCRIPTION |
|---|---|
| Listen on CTI Connection Request | Result returns success after CSTA SI binds the specified TCP listen port to a socket and starts listening on the socket. Otherwise any encountered error (COM, Winsock, etc.) value is returned |
| Stop Listen on CTI Connection Request | Result returns success after CSTA SI close the listen socket. Otherwise any encountered error (COM, Winsock, etc.) value is returned |
| Close CTI link | Result returns success after CSTA SI close the active socket for the specified CTI link. Otherwise, any encountered error (COM, Winsock, etc.) value is returned. |
| Reply to CTI link Request | CTI SM sends this request in an asynchronous reply to CTI Link Requested event. The CTI SM accepts the CTI link request only if the requestor's Transport Address is in the configured list and the total number of CTI links does not exceed the configured maximum. |
| Result Return | This is a positive asynchronous reply to all the Requests other than Monitor Start, Conference Call, Make Predictive Call, Snapshot Device, Transfer Call, Query Device (these have their own returns), Route Select and Route End (these do not get positive returns). After receiving this, the SI sends back RORS to the CTI server. |
| Error Return | This is a negative asynchronous reply to all the requests. After receiving this, SI sends back ROER to CTI server. |
| Monitor Start Return (SI only request) | This is a positive asynchronous reply to Monitor Start. All the future events reported on the monitored device shall have the Monitor Cross Reference ID specified here. Filter Used by CSTA IM may be different from Filter specified by the CTI server in Monitor Start. |
| Conference Call Return | This is a positive asynchronous reply to Conference Call |
| Make Predictive Call Return | This is a positive asynchronous reply to Make Predictive Return Call |
| Snapshot Device Return | This is a positive asynchronous reply to Snapshot Device |
| Transfer Call Return | This is a positive asynchronous reply to Transfer Call |
| Query Device Return | This is a positive asynchronous reply to Query Device |
| Route Request | Call context data is delivered to CTI server in the correlator data field transparently. There is no positive reply to this request. CTI SM expects to receive Route Select or Route End events later. For a negative reply, CTI SM receives Error Return. (CTI link ID, Route cross- Ref ID) is used to match events. |
| Route End | This request indicates that the call has been routed as specified, that the Routing relationship is over. There is no positive reply to this request. For a negative reply, CTI SM receives Error Return. The (CTI link ID, Route X Ref ID) is used to match the reply to the request. |

TABLE 9-continued

CSTA IM Requests (from SM) and
CSTA SI Requests (from IM)

| REQUESTS | DESCRIPTION |
|---|---|
| Re-Route | This request asks for an alternate destination to CTI server. There is no positive reply to this request. CTI SM expects to receive Route Select or Route End events later. For a negative reply, CTI SM receives Error Return. (CTI link ID, Route X Ref ID) is used to match these |
| Route Used | This request is sent to CTI server if a received Route Select event indicates to do so. |
| Agent State | Agent event type can be:<br><br>Agent Logged On,<br>Agent Logged Off;<br>Agent No Ready,<br>Agent Ready,<br>Agent Working After Call |
| Call Cleared | This event report follows the last Connection Cleared Event in the call. An involved device can be Agent or Agent Group. |
| Conferenced | This event report occurs for each monitored device in the involved call(s). An involved device can be an Agent only |
| Connection Cleared | This event report occurs for each monitored device in the involved call(s). An involved device can be Agent or Agent Group. |
| Delivered | This event report occurs for each monitored device in the involved call(s). An involved device can be Agent or Agent Group |
| Diverted | This event report occurs for the diverting device. The device can be Agent or Agent Group. |
| Established | This event report occurs for each monitored device involved in the call. A device can be an Agent only. |
| Failed | This event report occurs for each monitored device involved in the call. A device can be an Agent or Agent group. |
| Held | This request occurs for each monitored device involved in the call. A device can be an Agent only. |
| Network Reached | This event report occurs when the monitored device is involved in the call. A device can be an Agent only |
| Originated | This event report occurs when the monitored device is involved in the call. A device can be an Agent only |
| Queued | This request occurs for each monitored device involved in the call. A device can be an Agent or Agent group. |
| Retrieved | This request occurs for each monitored device involved in the call. A device can be an Agent only. |
| Service Initiated | This event report occurs when the monitored device is involved in the call. A device can be an Agent only. |
| Transferred | This event report occurs for each monitored device involved in the call. A device can be an Agent only. |

Table 10 shows an exemplary list of requests received by the CTI Service Manager 418 from the Agent Manager 384.

TABLE 10

CTI SM Requests (from AM)

| REQUEST | DESCRIPTION |
|---|---|
| Route Request | Call context data is delivered transparently to the CTI server in a correlator data field. The SM returns a unique route cross-reference |

TABLE 10-continued

CTI SM Requests (from AM)

| REQUEST | DESCRIPTION |
|---|---|
| | ID for the routing relationship. The AM expects to receive subsequently a Route Select or Route End event from the SM. |
| Route End | This indicates to the CTI SM that the call has been routed as specified or that an error condition occurred during the routing, and that the AM wants to terminate routing relationship between the CTI server and the AM (identified by route cross reference ID). |
| Route Used | This request is sent if the Route Select specifies that Route Used is required. |
| Re-Route | The AM expects to receive a Route Select or Route End event from the SM. |

Table 11 shows an exemplary list of events issued the CTI Service Manager (SM) 418 to the Agent Manager (AM) 384.

TABLE 11

CTI SM Events (to AM)

| EVENT | DESCRIPTION |
|---|---|
| Route Select | Route cross reference ID references the one the CTI SM returned to Agent Manager. The event includes a device id of the device to which the call is to be routed. The device can be an Agent or Agent group. The CTI SM expects to receive subsequently a Route End or Re-Route request from the AM. |
| Route End | This event indicates to the AM that the CTI server is not involved in call routing anymore or that an error occurred in accommodating the routing service request, and wants to terminate routing relationship. Also this event is sent when the SM receives Error Return from the IM, which is the result of either a ROER or RORJ received from the CTI server, or a negative response sent by SI to IM |

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPOM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. In a packet-based network having a caller system transmitting a request to conduct a multimedia telephonic conference, a multimedia telephonic communication system, comprising:
    a server system coupled to a plurality of agent systems, and the server system in communication with the caller system via the packet-based network for receiving the request, the server system having software installed thereon and a processor executing the software, the software including:
        an automatic call distributor (ACD) for controlling multimedia telephonic conferences by selecting at least one agent system among the plurality of agent systems for communication with the caller system;
        a call processing system responsive to the selection by the ACD of the at least one agent system to establish the multimedia telephonic conference between the caller system and the at least one agent system; and
        a computer technology integration (CTI) subsystem in communication with a CTI server for conducting conferences through the CTI server.

2. In a packet-based network having a caller systems transmitting requests to conduct multimedia telephonic conferences, a multimedia telephonic communication system, comprising:
    a server system configured to coupled to the caller systems via the packet-based network and to a plurality of agent systems, and the server system having software installed thereon and a processor executing the software, the software including:
        an automatic call distributor (ACD) for controlling multimedia telephonic conferences;
        and the ACD including:
            a call context mapper responsive to call context mapper requests to determine on the basis of call context a sequence of actions specific to each group of agent systems to perform for each telephonic conference; and
            an agent manager for managing both call queues associated with each corresponding group of agent systems among the plurality of agent systems as well as the multimedia telephonic conferences, and the agent manager responsive throughout each telephonic conference to requests from both agent systems and callers to generate corresponding call context mapper requests, including responsiveness to a request to conduct a telephonic conference from a caller system to generate the corresponding call context mapper request identifying the call context and to execute the sequence of actions determined by the call context mapper in response thereto.

3. The multimedia telephonic communication system of claim 2, wherein the sequence of actions include: at least one greeting action and at least one conditional action based on an availability of an agent system in the corresponding call queue.

4. The multimedia telephonic communication system of claim 1, wherein the ACD further comprises:
    tables for selecting the at least one agent system among the plurality of agent systems based on at least one of a call type and a time of day.

5. The multimedia telephonic communication system of claim 4, wherein the tables further comprise:
    lists of actions to perform for a call, based on at least one of the call type and the time of day.

6. The multimedia telephonic communication system of claim 5, wherein the actions include: at least one of a greeting and a predetermined media to transmit to the caller system.

7. The multimedia telephonic communication system of claim 1, wherein the ACD further comprises:
    an agent manager for managing the plurality of agent systems including: login, logout and tracking changes in an availability of each of the plurality of agent systems.

8. The multimedia telephonic communication system of claim 1, wherein the ACD further comprises:
a media player for transmitting at least one of audio and video media to the caller system.

9. In a packet-based network, a call center for handling multimedia telephonic calls from caller systems over the network, comprising:
a plurality of agent systems each including;
  a multimedia computer having software installed thereon and a processor executing the software, the software including:
    an agent application providing a graphical user interface (GUI) with icons for manipulating calls including at least one of: a call hold, a call mute, a call transfer to another one of the plurality of agent systems, a call conference with another one of the plurality of agent systems; and
a server system coupled to the plurality of agent systems and the server system in communication with at least one of the caller systems to receive a request over the packet-based network to conduct a telephonic conference, and the server system having software installed thereon and a processor executing the software, the software including:
an automatic call distributor (ACD) for controlling multimedia telephonic conferences including selecting at least one agent system among the plurality of agent systems for communication with the caller system and communicating with the agent application on the at least one selected agent system to manipulate each call; and
a call processing system responsive to the selection by the ACD of the at least one agent system to establish a telephonic conference between the caller and the at least one agent system in response to the request.

* * * * *

UNITED STATES PATENT AND TRADEMARK OFFICE
CERTIFICATE OF CORRECTION

PATENT NO. : 6,731,609 B1
DATED : May 4, 2004
INVENTOR(S) : James Hirni et al.

It is certified that error appears in the above-identified patent and that said Letters Patent is hereby corrected as shown below:

Column 42,
Line 15, cancel "a" after "having". The line should read -- In a packet-based network having caller systems --.
Line 19, change "coupled" to -- couple --.
Line 52, add -- : -- after "at least one of".
Line 59, cancel ":" after "include" and add -- : -- after "of". The line should read -- claim 5, wherein the actions include at least one of: a --.

Signed and Sealed this

Thirty-first Day of August, 2004

JON W. DUDAS
*Director of the United States Patent and Trademark Office*